US012745235B2

(12) United States Patent
Zhou et al.

(10) Patent No.: US 12,745,235 B2
(45) Date of Patent: Sep. 22, 2026

(54) METHOD AND DEVICE FOR DETERMINING SIDELINK RESOURCE

(71) Applicant: Samsung Electronics Co., Ltd., Suwon-si (KR)

(72) Inventors: Miao Zhou, Beijing (CN); Feifei Sun, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 501 days.

(21) Appl. No.: 17/920,248

(22) PCT Filed: Apr. 21, 2021

(86) PCT No.: PCT/KR2021/005015
§ 371 (c)(1),
(2) Date: Oct. 20, 2022

(87) PCT Pub. No.: WO2021/215822
PCT Pub. Date: Oct. 28, 2021

(65) Prior Publication Data

US 2023/0254842 A1 Aug. 10, 2023

(30) Foreign Application Priority Data

Apr. 22, 2020 (CN) ......................... 202010323762.0

(51) Int. Cl.
*H04W 72/1263* (2023.01)
*H04W 72/02* (2009.01)
(Continued)

(52) U.S. Cl.
CPC ....... *H04W 72/1263* (2013.01); *H04W 72/02* (2013.01); *H04W 72/25* (2023.01); *H04W 72/53* (2023.01); *H04W 72/542* (2023.01)

(58) Field of Classification Search
CPC . H04W 72/1263; H04W 72/02; H04W 72/25; H04W 72/53; H04W 72/542;
(Continued)

(56) References Cited

U.S. PATENT DOCUMENTS 11,102,631 B2 8/2021 Zhang et al.
11,483,821 B2 10/2022 Liu et al.
(Continued)

FOREIGN PATENT DOCUMENTS

CN 109121209 A 1/2019
CN 109121214 A 1/2019
(Continued)

OTHER PUBLICATIONS

"UE-assisted resource allocation for NR V2X", 3GPP TSG-RAN WG2 Meeting #105, R2-1900815, Athens, Greece, Feb. 25-Mar. 1, 2019 (Year: 2019).*
(Continued)

*Primary Examiner* — Moo Jeong
*Assistant Examiner* — David Zhijun Sun
(74) *Attorney, Agent, or Firm* — Jefferson IP Law, LLP

(57) ABSTRACT

The present disclosure relates to a communication method and system for converging a 5th-generation (5G) communication system for supporting higher data rates beyond a 4th-generation (4G) system with a technology for internet of things (IoT). The present disclosure may be applied to intelligent services based on the 5G communication technology and the IoT-related technology, such as smart home, smart building, smart city, smart car, connected car, health care, digital education, smart retail, security and safety services. The disclosure discloses a communication method of a first user equipment (UE), the method including: determining, by the first UE, a candidate sidelink resource set, when a preset determination condition is satisfied; and
(Continued)

Step 401: Determine, by a RX UE, a candidate sidelink resource set, when a preset determination condition is satisfied Step 402: Transmit, by the RX UE, the determined candidate sidelink resource set for determining a resource for sidelink transmission, when a preset transmission condition is satisfied transmitting, by the first UE, the determined candidate sidelink resource set, when a preset transmission condition is satisfied, wherein the candidate sidelink resource set is used for determining a resource for sidelink transmission.

20 Claims, 7 Drawing Sheets

(51) Int. Cl.
*H04W 72/25* (2023.01)
*H04W 72/53* (2023.01)
*H04W 72/542* (2023.01)

(58) Field of Classification Search
CPC ......... H04W 92/18; H04W 4/70; H04W 4/40; H04W 64/00; H04W 72/51; H04W 72/569
See application file for complete search history.

(56) References Cited

U.S. PATENT DOCUMENTS

| | | | | |
|---|---|---|---|---|
| 11,659,371 | B2 | 5/2023 | Zhang et al. | |
| 2013/0044727 | A1 | 2/2013 | Nory et al. | |
| 2017/0280469 | A1 | 9/2017 | Park et al. | |
| 2018/0324842 | A1 | 11/2018 | Gulati et al. | |
| 2020/0107297 | A1 | 4/2020 | Wang et al. | |
| 2020/0107303 | A1 | 4/2020 | Hahn | |
| 2020/0389900 | A1 | 12/2020 | Lee et al. | |
| 2021/0219320 | A1* | 7/2021 | Belleschi | H04W 72/20 |
| 2022/0110096 | A1* | 4/2022 | Lin | H04W 74/0808 |
| 2023/0171738 | A1* | 6/2023 | Di Girolamo | H04W 72/02 370/329 |

FOREIGN PATENT DOCUMENTS

| | | | |
|---|---|---|---|
| CN | 109219131 | A | 1/2019 |
| CN | 110679190 | A | 1/2020 |
| CN | 110958586 | A | 4/2020 |
| WO | 2020/011336 | A1 | 1/2020 |
| WO | 2020/029127 | A1 | 2/2020 |
| WO | 2020/033088 | A1 | 2/2020 |

OTHER PUBLICATIONS

Extended European Search Report dated Feb. 13, 2024, issued in European Patent Application No. 21791841.6-1215.

MediaTek Inc.; UE-assisted resource allocation for NR V2X; 3GPP TSG-RAN WG2 Meeting #105; R2-1900815; Feb. 15, 2019, Athens, Greece.

Li Lan et al., Research on Radio Resource Pool Sharing Technology in LTE-eV2X, Oct. 15, 2018.

Samsung, UE procedure after sensing in UE autonomous resource selection, R1-164759, 3GPP TSG RAN WG1 Meeting #85, May 13, 2016, Nanjing.

Chinese Office Action dated Mar. 3, 2025, issued in Chinese Application No. 202010323762.0.

Japanese Office Action dated Apr. 1, 2025, issued in Japanese Application No. 2022-564647.

Spreadtrum Communications, Discussion on resource allocation for Mode 2, R1-1900705, 3GPP TSG RAN WG1 adhoc_NR_AH_1901, Taipei, Jan. 22, 2019.

Japanese Notice of Allowance dated Sep. 4, 2025, issued in Japanese Patent Application No. 2022-564647.

Chinese Office Action dated Oct. 30, 2025, issued in Chinese Patent Application No. 202010323762.0.

Chinese Office Action dated Jan. 28, 2026, issued in Chinese Application No. 202010323762.0.

3rd Generation Partnership Project; Technical Specification Group Radio Access Network; NR; Physical layer procedures for data (Release 16), 3GPP TS 38.214 v16.1.0, Apr. 1, 2020.

Korean Office Action dated Apr. 21, 2026, issued in Korean Application No. 10-2022-7033893.

Chinese Office Action dated Apr. 29, 2026, issued in Chinese Application No. 202010323762.0.

* cited by examiner

[Fig. 1]
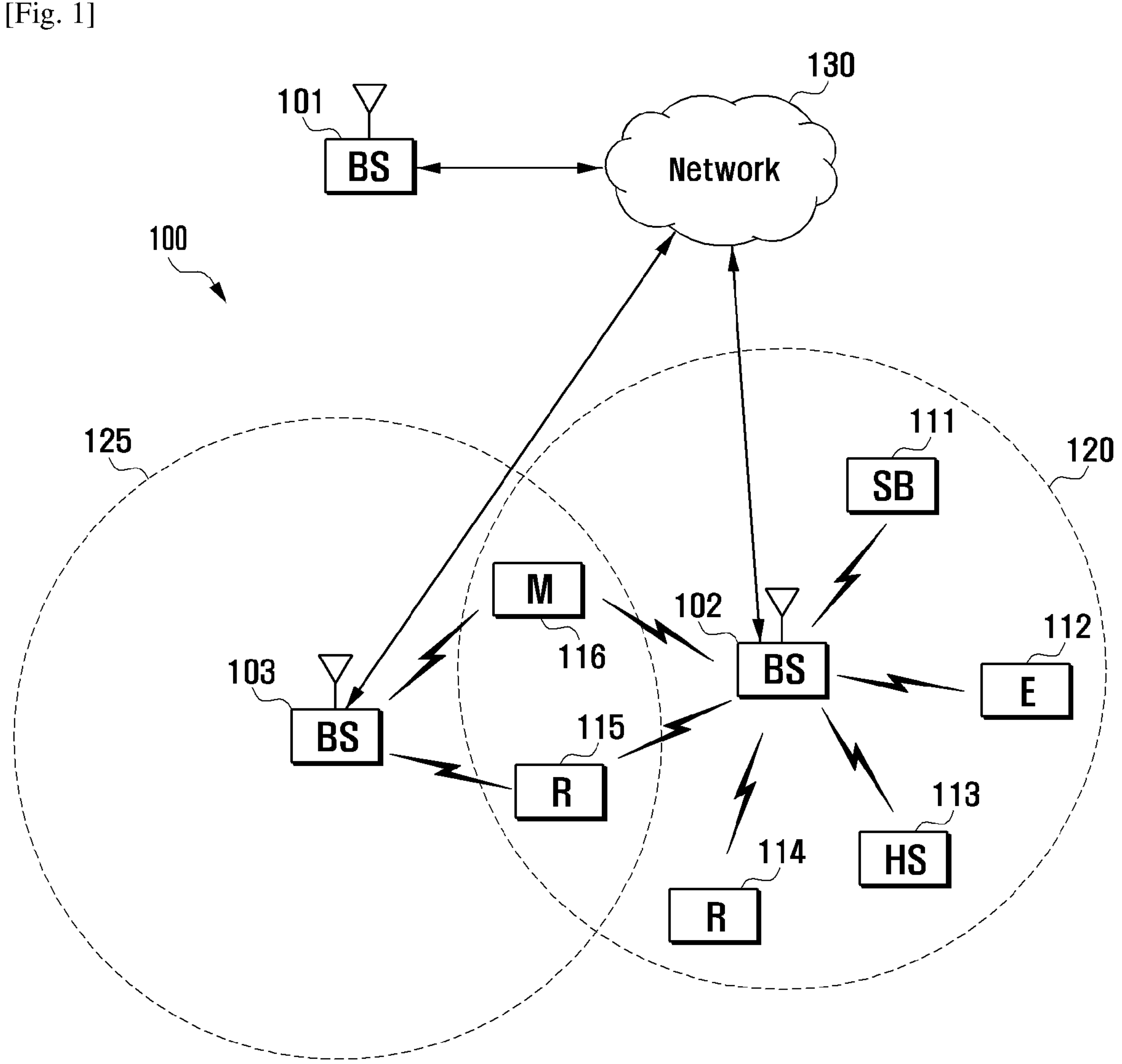

Data Input

205 Channel Coding & Modulation

210 S-to-P

215 Size N IFFT

220 P-to-S

225 Add Cyclic Prefix

230 UC

To Channel

[Fig. 2b]
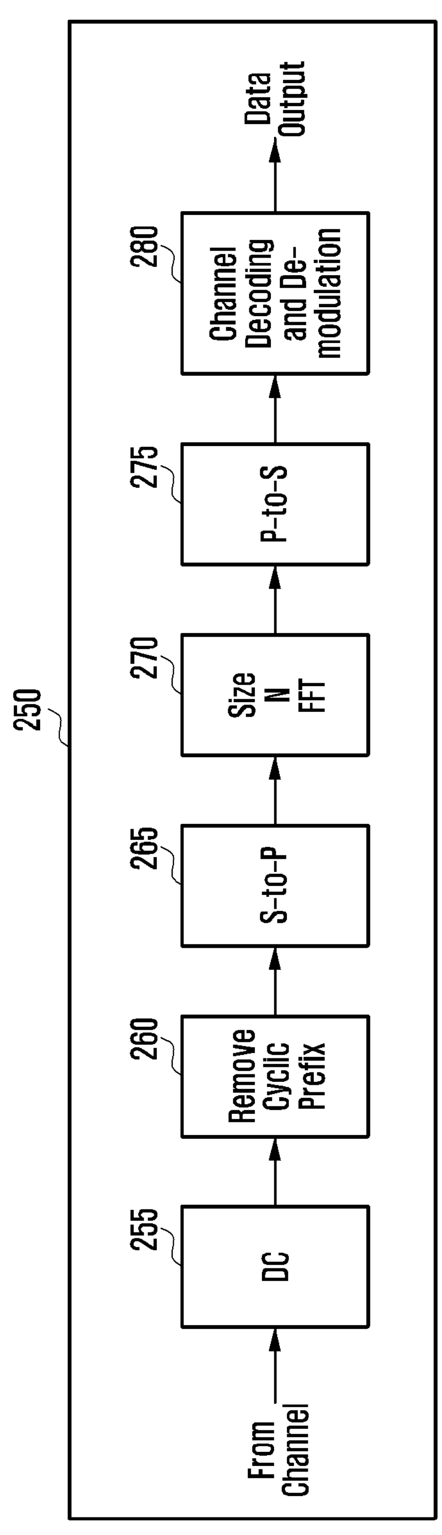

[Fig. 3a]
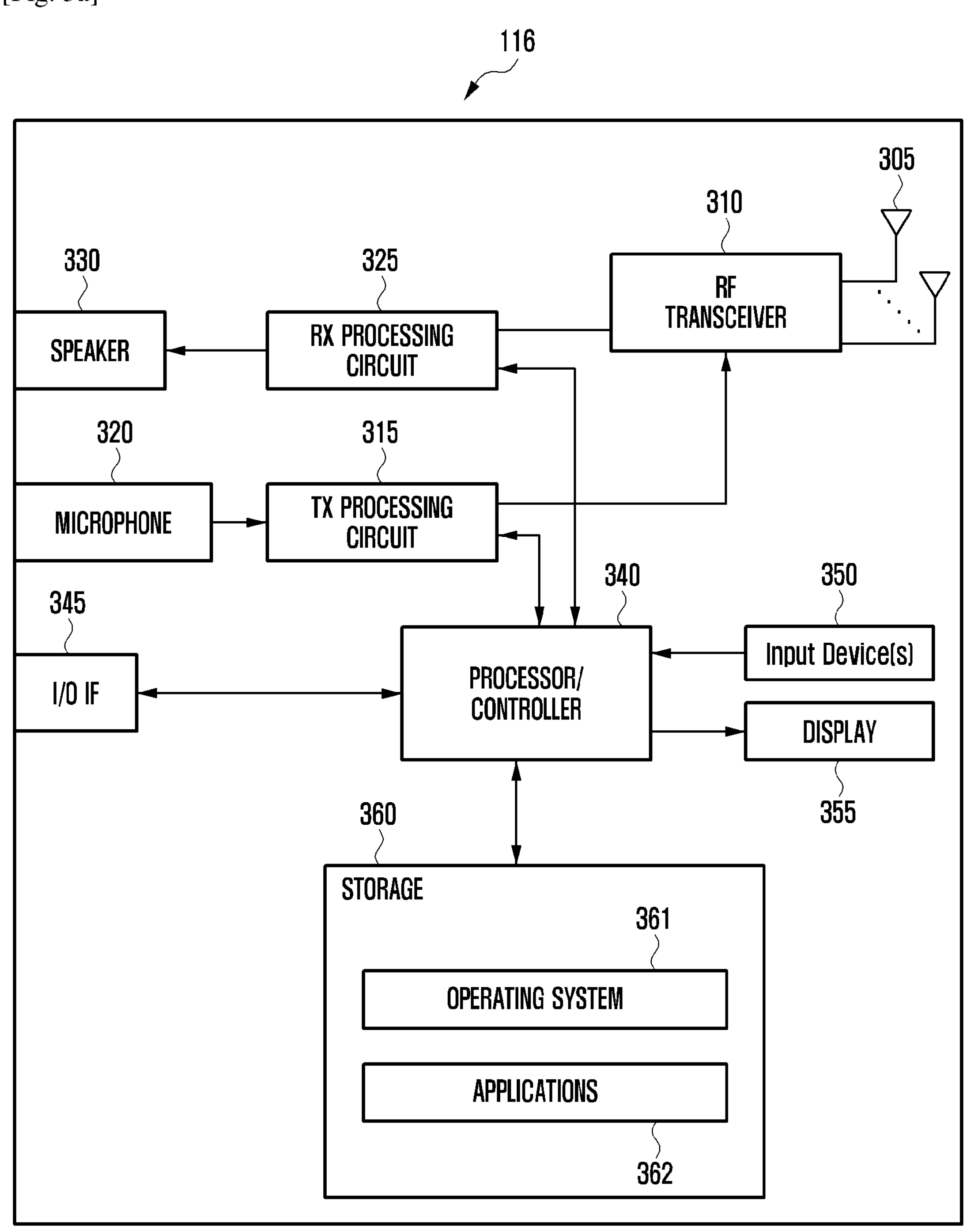

[Fig. 5]

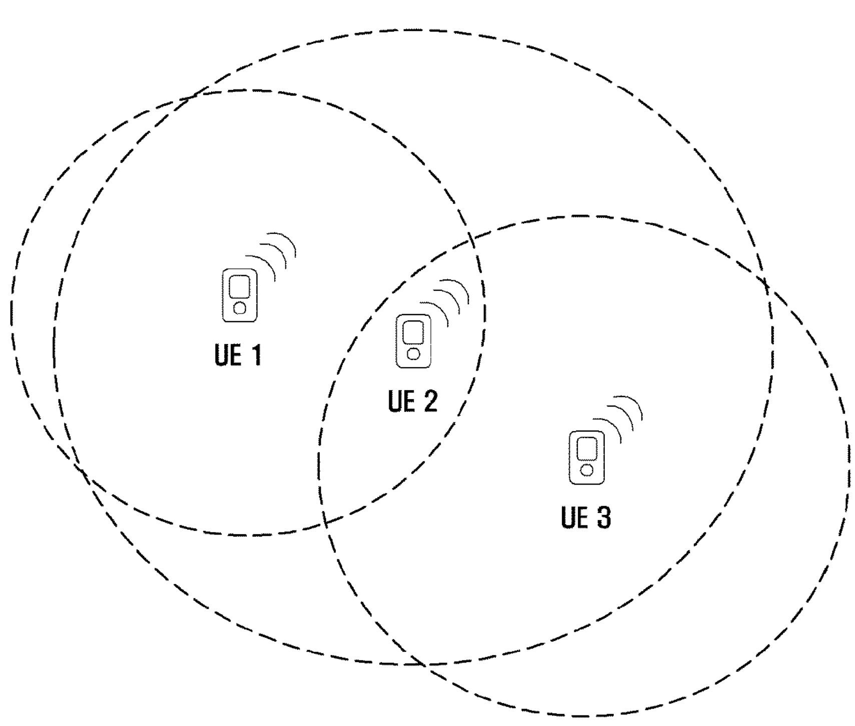

[Fig. 6]

Step 601: Determine, by a TX UE, a candidate sidelink resource set, when a preset determination condition is satisfied Step 602: Transmit, by the TX UE, the determined candidate sidelink resource set to a base station for determining a resource for sidelink transmission, when a preset transmission condition is satisfied

[Fig. 7]

Step 701: Determine, by UE M, a candidate sidelink resource set, when a preset determination condition is satisfied Step 702: Transmit, by UE M, the determined candidate sidelink resource set to group member UEs m1, m2, ... for determining a resource for sidelink transmission, when a preset transmission condition is satisfied

METHOD AND DEVICE FOR DETERMINING SIDELINK RESOURCE

TECHNICAL FIELD

The application relates to the technical field of wireless communication, and more particularly, to a method and a device for determining a sidelink resource for transmitting sidelink signaling in sidelink (SL) communication in a fifth-generation new radio (5G NR) access technical system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a ‘Beyond 4G Network’ or a ‘Post LTE System’.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In 5G systems, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as “sensing technology”, “wired/wireless communication and network infrastructure”, “service interface technology”, and “Security technology” have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

DISCLOSURE OF INVENTION

Technical Problem

In the prior art, a TX UE using Mode 2 determines which resources are reserved by other sidelink UEs only according to a channel sensing result and excludes the above resources, and then randomly selects a sidelink resource for transmitting a sidelink transmission to an RX UE in remaining resources.

The main disadvantage of this method is that the TX UE can only select a resource based on a channel state sensed by itself. However, due to the different geographic locations of the TX UE and the RX UE, the interferences suffered are also different. The TX UE considers that the available resources may not be applicable to the RX UE based on the channel sensing result. The problem of a hidden node in a sidelink network is a typical example. UE1 and UE3 are both within the communication range of UE2, but UE1 and UE3 are outside the communication range of each other. Therefore, when UE1 serves as a TX UE, it cannot sense the interference from UE3, but the interference from UE3 will actually cause damage to the reception of the transmission from UE1 by UE2.

In the prior art, the TX UE using Mode 1 requests a sidelink resource from the base station through a status report (SR) and/or a Buffer Status Report (BSR) and a sidelink HARQ-ACK report, and after obtaining a sidelink resource scheduled by the base station, uses the sidelink resource to transmit a sidelink transmission to the RX UE.

The main disadvantage of this method is that the base station can only schedule sidelink UEs using Mode 1 in the cell and minimize the mutual interference among the sidelink UEs, but cannot control UEs in the neighboring cell and sidelink UEs using Mode 2 in the cell. Therefore, if a resource pool used by a sidelink UE of Mode 1 overlaps with a resource pool for a UE in the neighboring cell and a sidelink UE using Mode 2 in the cell, resources scheduled by a base station for sidelinks using Mode 1 may be interfered by this part of UEs.

In the prior art, the main disadvantage of the using of Mode 2 is that there is no difference in resource selection method between multicast communication and unicast communication of TX UE.

In the prior art, the main disadvantage of the using of Mode 1 is that it is difficult for a base station to detect a channel condition of a sidelink UE.

Solution to Problem

The embodiments herein provide a communication method of a first user equipment (UE), the method comprising: determining, by the first UE, a candidate sidelink resource set, when a preset determination condition is satisfied; and transmitting, by the first UE, the determined candidate sidelink resource set, when a preset transmission condition is satisfied, wherein the candidate sidelink resource set is used for determining a resource for sidelink transmission. And a communication method of an electronic device comprises: receiving a candidate sidelink resource set; and determining a resource for sidelink transmission according to the candidate sidelink resource set and/or a channel sensing result.

Accordingly, embodiments herein provide a first user equipment (UE), the first UE comprising: a transceiver; and a controller configured to: determine a candidate sidelink resource set, when a preset determination condition is satisfied, and transmit, via the transceiver, the determined candidate sidelink resource set, when a preset transmission condition is satisfied, wherein the candidate sidelink resource set is used for determining a resource for sidelink transmission. And an electronic device, the electronic device comprising: a transceiver; and a controller configured to: receive a candidate sidelink resource set, and determine a resource for sidelink transmission according to the candidate sidelink resource set or a channel sensing result.

Advantageous Effects of Invention

The method in the first embodiment enables a TX UE to take sidelink resources preferred by an RX UE as a reference when selecting a sidelink resource, so as to avoid the above problems. Furthermore, if the RX UE provides a preferred resource set, the TX UE may perform channel sensing based on this resource set instead of all potential transmission resources. This method reduces the scale of channel sensing, thus reducing the complexity and power consumption of the TX UE.

The method in the second embodiment enable a base station to take sidelink resources preferred by a TX UE as a reference when scheduling a sidelink resource for the TX UE, so as to avoid potential interferences.

In the third embodiment, a specific UE is taken as a group manager UE M, and UE M assists a group member UE m in resource selection as a further optimization based on the prior art. The method in the third embodiment may make the group manager UE M realize the effect of allocating sidelink resources for group members by providing information assisting resource selection, and play a scheduling role similar to a base station, thereby reducing the potential conflict risk among group members UE M.

In the third embodiment, the group manager UE M may infer the channel condition of the group member UE M through channel sensing to a certain extent. The gain is particularly significant when a distance between the group manager UE M and other group members UE M is close.

BRIEF DESCRIPTION OF DRAWINGS

By describing the embodiments of the disclosure in more detail with reference to the accompanying drawings, the above and other objectives, features and advantages of the disclosure will become more apparent. The accompanying drawings are used to provide a further understanding of the embodiments of the disclosure, and constitute a part of the specification, and are used to explain the disclosure together with the embodiments of the disclosure, and do not constitute a limitation to the disclosure. In the accompanying drawings, the same reference numerals generally represent the same parts or stages.

FIG. 1 illustrates a schematic diagram with respect to a wireless network;

FIGS. 2*a* and 2*b* illustrates schematic diagrams with respect to wireless transmit and receive paths in a wireless network;

FIG. 3*a* illustrates a schematic diagram with respect to a user equipment (UE);

FIG. 5 illustrates a relationship between communication ranges of a plurality of user equipments in a typical scenario of the method shown in FIG. 4;

FIG. 6 illustrates a flowchart of another method for determining a sidelink resource;

FIG. 7 illustrates a flowchart of another method for determining a sidelink resource.

MODE FOR THE INVENTION

Figure 3B:
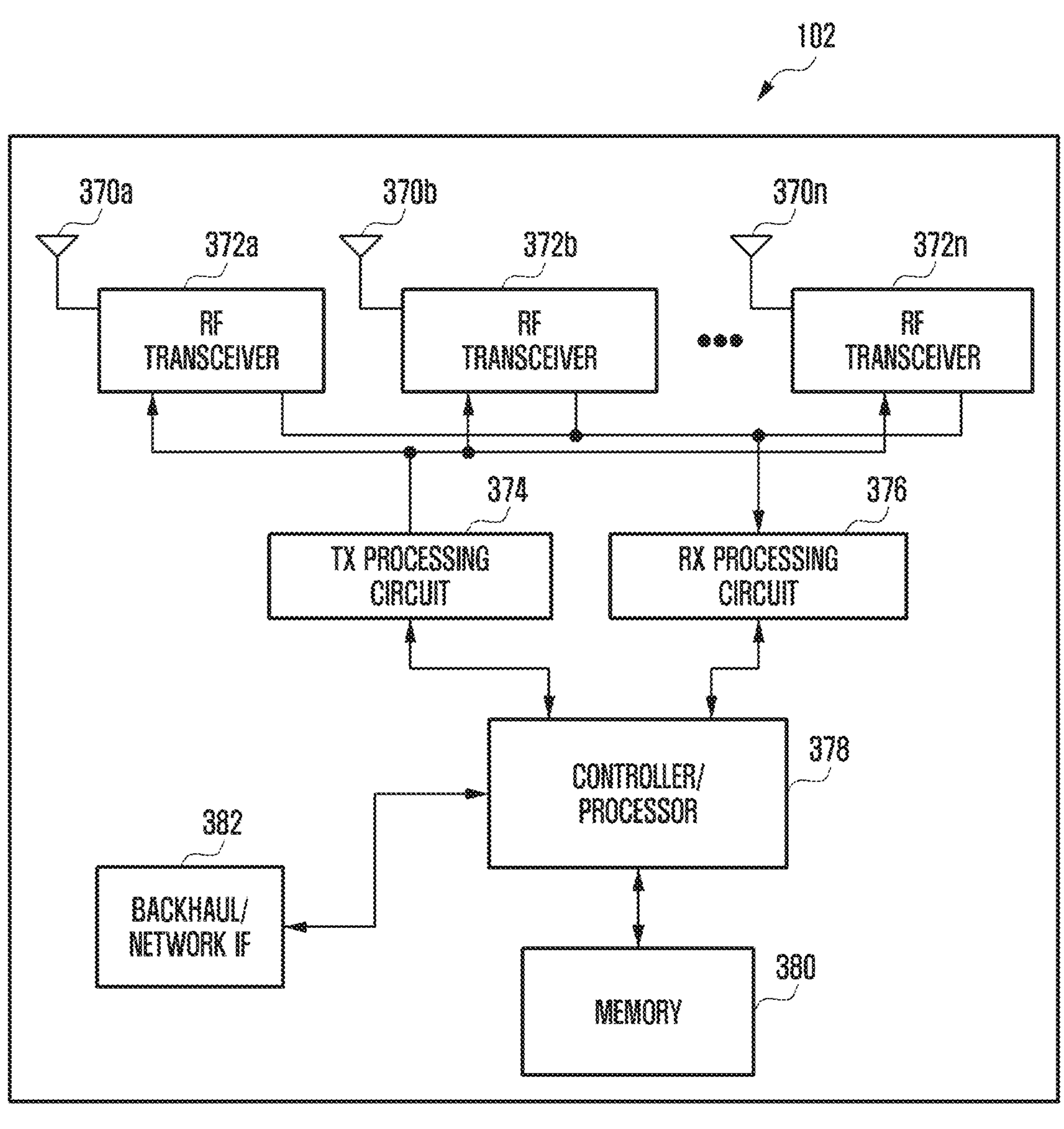
FIG. 3*b* illustrates a schematic diagram with respect to a base station (gNB)

In long term evolution (LTE) technology, sidelink communication mainly includes two types of mechanisms including direct device to device (D2D) communication and vehicle to vehicle/infrastructure/pedestrian/network (collectively referred to as V2X) communication, where the V2X communication is designed based on the D2D technology, is superior to the D2D in data rate, delay, reliability and link capacity, and is the most representative sidelink communication technology in LTE technology. In 5G systems, sidelink communication mainly includes V2X communication currently.

There are several sidelink physical channels defined in a NR V2X system, including a physical sidelink control channel (PSCCH), a physical sidelink shared channel (PSSCH) and a physical side link feedback channel (PSFCH). The PSSCH is used to carry data, the PSCCH is used to carry sidelink control information (SCI), information such as the time-frequency domain resource location of the associated PSSCH, modulation and coding scheme, the identifier ID of the receiving target for the associated PSSCH are indicated in the SCI, and the PSFCH is used to carry HARQ-ACK information corresponding to the data.

The current NR V2X system takes a slot in the 5G systems as a smallest unit for resource allocation in the time domain, and defines a sub-channel as a smallest unit for resource allocation in the frequency domain, where a sub-channel is configured as several resource block (RB) in the frequency domain, and a sub-channel may include resources corresponding to at least one of a PSCCH, a PSSCH and a PSFCH.

From the perspective of resource allocation, 5G sidelink communication systems include two types of modes: one is a resource allocation mode based on the scheduling of a base station; and the other is a resource allocation mode independently selected by a user equipment (UE). In 5G V2X systems, the resource allocation mode based on the scheduling of a base station is referred to as Mode 1; and the resource allocation mode independently selected by a UE is referred to as Mode 2.

For Mode 1, the resource allocation mode based on the scheduling of a base station means that the base station transmits a sidelink grant to a UE for sidelink transmission (hereinafter referred to as "sidelink UE"), and indicates several sidelink resources for the sidelink UE in the sidelink grant, and/or indicates periodic sidelink resources for the sidelink UE in the sidelink grant. Sidelink grants include dynamic grants and configured grants, where dynamic grants are indicated by downlink control information (DCI); and configured grants further include configured grants of type 1 indicated by radio resource control (RRC) signaling and configured grants of type 2 indicated by RRC signaling and activated/deactivated by DCI.

For Mode 2, the method for a sidelink UE to select resources autonomously means that the UE determines a specific time window before a sidelink transmission according to an expected time range for transmitting the sidelink transmission, and the UE perform the channel sensing within the specific time window, and then excludes the sidelink resources that have been reserved by other sidelink UEs according to a result of the channel sensing, and randomly selects the sidelink resources that have not been excluded.

The disclosure provides a method and a device for determining a sidelink resource.

According to an aspect of the disclosure, a communication method of a first user equipment (UE) is provided, the method includes: determining, by the first UE, a candidate sidelink resource set, when a preset determination condition is satisfied; and transmitting, by the first UE, the determined candidate sidelink resource set, when a preset transmission condition is satisfied, wherein the candidate sidelink resource set is used for determining a resource for sidelink transmission.

In addition, according to the method of the aspect of the disclosure, determining, by the first UE, a candidate sidelink resource set further includes: determining the candidate sidelink resource set based on a request received, wherein the request instructs the first UE to assist other UEs or base stations supporting sidelink transmission to determine the sidelink resource.

In addition, according to the method of the aspect of the disclosure, wherein the preset determination condition includes at least one of: a condition of a configuration attribute; a condition of a link state; a condition of a time parameter; or a request being received, wherein the request instructs the first UE to assist other UEs or base stations supporting sidelink transmission to determine the sidelink resource.

In addition, according to the method of the aspect of the disclosure, wherein the condition of the configuration attribute includes at least one of: the first UE being configured to assist other UEs or base stations supporting sidelink transmission to determine the sidelink resource; the first UE being configured to periodically determine the candidate sidelink resource set; a second UE being a specific sidelink UE; a priority corresponding to data of the first UE or the second UE belonging to a specific range; or a cast type corresponding to the data of the first UE or the second UE being a specific type, wherein the second UE is a UE that is to be assisted by the first UE to determine the sidelink resource, and/or a UE that performs a sidelink communication with the first UE.

In addition, according to the method of the aspect of the disclosure, wherein the condition of the link state includes at least one of: the number of times that the first UE fails to successfully receive a sidelink transmission from the second UE exceeding a threshold value; the number of times that the second UE fails to successfully receive a sidelink transmission from the first UE exceeding a threshold value; a link quality between the first UE and the second UE being lower than a threshold value; a geographical distance between the first UE and the second UE exceeding a threshold value; a congestion degree of a resource pool exceeding a threshold value; or a resource for sidelink transmission indicated by the second UE overlapping with a resource for sidelink transmission indicated by other UEs supporting sidelink transmission, wherein the second UE is a UE that is to be assisted by the first UE to determine the sidelink resource, and/or a UE that performs a sidelink communication with the first UE.

In addition, according to the method of the aspect of the disclosure, wherein a link quality between the first UE and the second UE being lower than a threshold value is determined by at least one of: reference signal receiving power (RSRP) or reference signal receiving quality (RSRQ) of the second UE, which is measured by the first UE, being lower than a threshold value; RSRP or RSRQ of the first UE, which is fed back by the second UE to the first UE, being lower than a threshold value; a channel state information (CSI) related parameter of the second UE, which is measured by the first UE, being lower than a threshold value; or a CSI related parameter of the first UE, which is fed back by the second UE to the first UE, being lower than a threshold value.

In addition, according to the method of the aspect of the disclosure, wherein the condition of the time parameter includes at least one of: a sidelink transmission transmitted to the second UE by the first UE within a specific time range existing; a sidelink transmission transmitted to the first UE by the second UE within a specific time range existing; or the first UE being configured to periodically determine the candidate sidelink resource set, wherein the second UE is a UE that is to be assisted by the first UE to determine the sidelink resource, and/or a UE that performs a sidelink communication with the first UE.

In addition, according to the method of the aspect of the disclosure, wherein the preset transmission condition includes at least one of: at least one of the preset determination condition; a sidelink transmission that is to be transmitted to the second UE by the first UE existing; an uplink transmission scheduled for the first UE by a base station existing; the first UE being configured to periodically transmit the determined candidate sidelink resource set to at least one of the second UE, a base station and a group manager UE; the number of times that the first UE receives a sidelink transmission from the second UE reaching a threshold value; or a specific duration having elapsed after the first UE receives a sidelink transmission from the second UE, wherein the second UE is a UE that is to be assisted by the first UE to determine the sidelink resource, and/or a UE that performs a sidelink communication with the first UE.

In addition, according to the method of the aspect of the disclosure, wherein the determining of the candidate sidelink resource set includes at least one of: determining an initial candidate sidelink resource set; excluding a sidelink resource from the initial candidate sidelink resource set according to a channel sensing result of the first UE and/or a candidate resource set received from other UEs supporting sidelink transmission; excluding a sidelink resource from the initial candidate sidelink resource set according to an expected time range within which the first UE transmits other sidelink data and/or uplink data, and/or an expected time range within which the first UE receives downlink data; or determining sidelink resources not excluded in the initial candidate sidelink resource set or a subset of the sidelink resources not excluded in the initial candidate sidelink resource set as the candidate sidelink resource set.

In addition, according to the method of the aspect of the disclosure, wherein excluding a sidelink resource from the initial candidate sidelink resource set according to a candidate resource set received from other UEs supporting sidelink transmission includes: excluding a resource that is not in the candidate resource set received from the other UEs supporting sidelink transmission from the initial candidate sidelink resource set.

In addition, according to the method of the aspect of the disclosure, wherein excluding a sidelink resource from the initial candidate sidelink resource set according to an expected time range within which the first UE transmits other sidelink data and/or uplink data, and/or an expected time range within which the first UE receives downlink data includes: excluding a resource overlapping or partially overlapping with the time range from the initial candidate sidelink resource set.

In addition, according to the method of the aspect of the disclosure, wherein the transmitting of the determined candidate sidelink resource set includes at least one of: indicating the determined candidate sidelink resource set by a radio resource control (RRC) signaling; indicating the determined candidate sidelink resource set by a medium access control (MAC) signaling; or indicating the determined candidate sidelink resource set by a physical layer signaling.

According to another aspect of the disclosure, a communication method of an electronic device is provided, the method including: receiving a candidate sidelink resource set; and determining a resource for sidelink transmission according to the candidate sidelink resource set and/or a channel sensing result.

According to the method of the other aspect of the disclosure, wherein the determining of the resource for sidelink transmission further includes at least one of: excluding a sidelink resource from the candidate sidelink resource set according to the channel sensing result; according to an expected time range within which the electronic device transmits other sidelink data and/or uplink data, and/or an expected time range within which the electronic device receives downlink data, excluding a sidelink resource overlapping or partially overlapping with the time range from the candidate sidelink resource set; or determining the resource for sidelink transmission in sidelink resources not excluded in the candidate sidelink resource set.

According to the method of the other aspect of the disclosure, wherein the resource for sidelink transmission are determined when at least one of the following conditions is satisfied: the number of sidelink resources in the candidate sidelink resource set exceeding a threshold value; or the number of sidelink resources not excluded in the candidate sidelink resource set exceeding a threshold value.

According to another aspect of the disclosure, a communication method of an electronic device is provided, the method including: transmitting a request when a preset request condition is satisfied, wherein the request instructs other UEs supporting sidelink transmission to assist the electronic device to determine a sidelink resource.

According to the method of the other aspect of the disclosure, wherein the preset request condition includes at least one of: a condition of a configuration attribute; a condition of a link state; a condition of a time parameter; the electronic device being configured to be able to request other UEs supporting sidelink transmission to assist the electronic device to determine the sidelink resource; the electronic device being configured to periodically transmit the request; or a packet reception ratio (PRR) and a packet inter-reception (PIR) of the electronic device being lower than a threshold value.

According to the method of the other aspect of the disclosure, wherein the condition of the configuration attribute includes at least one of: a third UE being configured to assist the electronic device to determine the sidelink resource; the electronic device being a specific sidelink UE; a priority corresponding to data of the electronic device or the third UE belonging to a specific range; a cast type corresponding to the data of the electronic device or the third UE being a specific type, wherein the third UE is a UE that is requested to assist the electronic device to determine the sidelink resource.

According to the method of the other aspect of the disclosure, wherein the condition of the link state includes at least one of: the number of times that a third UE fails to successfully receive a sidelink transmission from the electronic device exceeding a threshold value, or the number of times that the third UE fails to successfully receive a sidelink transmission from a fourth UE exceeding a threshold value; the number of times that the electronic device fails to successfully receive a sidelink transmission from the third UE exceeding a threshold value, or the number of times that the fourth UE fails to successfully receive a sidelink transmission from the third UE exceeding a threshold value; a link quality between the third UE and the electronic device being lower than a threshold value or a link quality between the third UE and the fourth UE being lower than a threshold value; a geographic distance between the third UE and the electronic device exceeding a threshold value or a geographic distance between the third UE and the fourth UE exceeding a threshold value; a congestion degree of a resource pool exceeding a threshold value; or a resource for sidelink transmission indicated by the electronic device overlapping with a resource for sidelink transmission indicated by other UEs supporting sidelink transmission, wherein the third UE is a UE that is requested to assist the electronic device to determine the sidelink resource, and the fourth UE is a UE that receives a sidelink transmission transmitted by the third UE or a UE that transmits a sidelink transmission to the third UE.

According to another aspect of the disclosure, wherein a link quality between the third UE and the electronic device being lower than a threshold value or a link quality between the third UE and the fourth UE being lower than a threshold value is determined by at least one of: reference signal receiving power (RSRP) or reference signal receiving quality (RSRQ) of the electronic device or the fourth UE, which is measured by the third UE, being lower than a threshold value; RSRP or RSRQ of the electronic device, which is fed back by the electronic device or the fourth UE to the third UE, being lower than a threshold value; a channel state information (CSI) related parameter of the electronic device or the fourth UE, which is measured by the third UE, being lower than a threshold value; or a CSI related parameter of the electronic device, which is fed back by the electronic device or the fourth UE to the third UE, being lower than a threshold value.

According to another aspect of the disclosure, wherein the condition of the time parameter includes at least one of: a third UE transmitting a sidelink transmission to the electronic device within a specific time range; or the third UE being configured to periodically determine a candidate sidelink resource set, wherein the third UE is a UE that is requested to assist the electronic device to determine the sidelink resource.

According to another aspect of the disclosure, a first user equipment (UE) that performs the aforementioned methods is provided.

According to another aspect of the disclosure, an electronic device that performs the aforementioned methods is provided.

According to another aspect of the disclosure, an electronic device that performs the aforementioned methods is provided.

It will be understood that both the foregoing general description and the following detailed description are exemplary and are intended to provide further explanation of the claimed technology.

FIG. 1 illustrates an example wireless network according to various embodiments of the disclosure. The embodiment of the wireless network shown in FIG. 1 is for illustration only. Other embodiments of the wireless network 100 can be used without departing from the scope of this disclosure.

The wireless network includes an gNodeB (gNB) 101, an gNB 102, and an gNB 103. The gNB 101 communicates with the gNB 102 and the gNB 103. The gNB 101 also communicates with at least one Internet Protocol (IP) 130, such as the Internet, a proprietary IP network, or other data network.

Depending on the network type, other well-known terms such as "base station" or "access point" can be used instead of "gNodeB" or "gNB." For the sake of convenience, the terms "gNodeB" and "gNB" are used in this patent document to refer to network infrastructure components that provide wireless access to remote terminals. Also, depending on the network type, other well-known terms such as "mobile station," "subscriber station," "remote terminal," "wireless terminal," or "user device" can be used instead of the term "user equipment" or "UE". For the sake of convenience, the terms "user equipment" and "UE" are used in this patent document to refer to remote wireless device that wirelessly accesses a gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, WiFi, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As will be described in more detail below, one or more of the gNB 101, the gNB 102, and the gNB 103 includes a 2D antenna array as described in embodiments of the disclosure. In some embodiments, one or more of gNB 101, gNB 102, and gNB 103 supports codebook design and structure for a system with a 2D antenna array.

Although FIG. 1 illustrates one example of a wireless network, various changes may be made to FIG. 1. For example, the wireless network can include any number of gNBs and any number of UEs in any suitable arrangement. Also, the gNB 101 can communicate directly with any number of UEs and provide those UEs with wireless broadband access to the network 130. Similarly, each of the gNBs 102-103 can communicate directly with the network 130 and provide UEs with direct wireless broadband access to the network 130. Further, the gNBs 101, 102, and/or 103 can provide access to other or additional external networks, such as external telephone networks or other types of data networks.

Figure 2A:
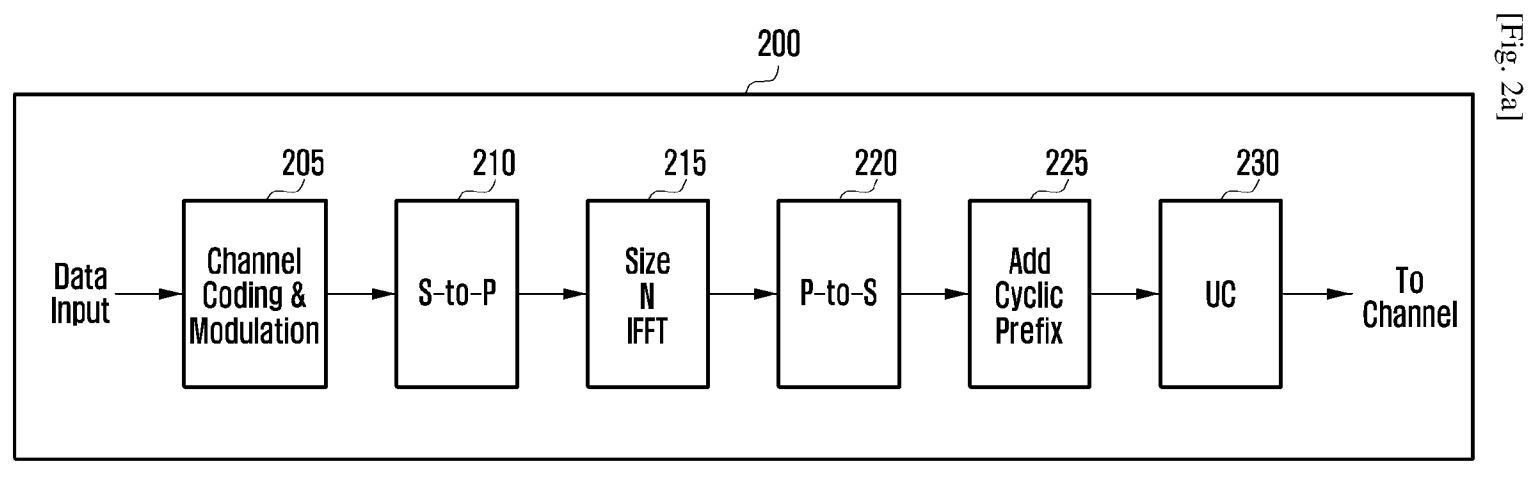

FIGS. 2*a* and 2*b* illustrate example wireless transmit and receive paths according to the disclosure. In the following description, a transmit path 200 can be described as being implemented in a gNB, such as the gNB 102, and a receive path 250 can be described as being implemented in a UE, such as the UE 116. However, it should be understood that the receive path 250 can be implemented in an gNB and the transmit path 200 can be implemented in a UE. In some embodiments, the receive path 250 is configured to support codebook design and structure for a system with a 2D antenna array as described in embodiments of the disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path circuitry 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding) and modulates the input bits (such as with quadrature phase shift keying (QPSK) or quadrature amplitude modulation (QAM)) to generate a sequence of frequency domain modulation symbols. The serial-to-parallel block 210 converts (i.e., de-multiplexes) the serial modulated symbols to parallel data to generate N parallel symbol streams where N is the IFFT/FFT size used in the gNB 102 and the UE 116. The size N IFFT block 215 performs an IFFT operation on the N parallel symbol streams to generate time domain output signals. The parallel-to-serial block 220 converts (such as multiplexes) the parallel time domain output symbols from the size N IFFT block 215 to generate a serial time domain signal. The add cyclic prefix block 225 inserts a cyclic prefix to the time domain signal. The up-converter 230 modulates (such as up-converts) the output of the add cyclic prefix block 225 to RF frequency for transmission via a wireless channel. The signal may also be filtered at baseband before conversion to RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time domain baseband signal. The serial-to-parallel block 265 converts the time domain baseband signal to parallel time domain signals. The size N FFT block 270 performs an FFT algorithm to generate N parallel frequency domain signals. The parallel-to-serial block 275 converts the parallel frequency domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2*a* and 2*b* can be implemented using only hardware or using a combination of hardware and software/firmware. As a particular example, at least some of the components in FIGS. 2*a* and 2*b* may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as discrete Fourier transform (DFT) and inverse discrete Fourier transform (IDFT) functions, can be used. It will be appreciated that the value of the variable N may be any integer number (such as 1, 2, 3, 4, or the like) for DFT and IDFT functions, while the value of the variable N may be any integer number that is a power of 2 (such as 1, 2, 4, 8, 16, or the like) for FFT and IFFT functions.

Although FIGS. 2*a* and 2*b* illustrate examples of wireless transmit and receive paths, various changes may be made to FIGS. 2*a* and 2*b*. For example, various components in FIGS. 2*a* and 2*b* can be combined, further subdivided, or omitted and additional components can be added according to particular needs. Also, FIGS. 2*a* and 2*b* are meant to illustrate examples of the types of transmit and receive paths that can be used in a wireless network. Any other suitable architectures can be used to support wireless communications in a wireless network.

FIG. 3*a* illustrates an example UE 116 according to the disclosure. The embodiment of the UE 116 illustrated in FIG. 3*a* is for illustration only, and the UEs 111-115 of FIG. 3*a* can have the same or similar configuration. However, UEs come in a wide variety of configurations, and FIG. 3*a* does not limit the scope of this disclosure to any particular implementation of a UE.

The UE 116 includes an antenna 305, a radio frequency (RF) transceiver 310, transmit (TX) processing circuitry 315, a microphone 320, and a receive (RX) processing circuitry 325. The UE 116 also includes a speaker 330, a processor/controller 340, an input/output (I/O) interface (IF) 345, an input device 350, a display 355, and a memory 360. The memory 360 includes a basic operating system (OS) program 361 and one or more applications 362.

The RF transceiver 310 receives, from the antenna 305, an incoming RF signal transmitted by an gNB of the wireless network 100. The RF transceiver 310 down-converts the incoming RF signal to generate an intermediate frequency (IF) or baseband signal. The IF or baseband signal is transmitted to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor/controller 340 for further processing (such as for web browsing data).

The TX processing circuitry 315 receives analog or digital voice data from the microphone 320 or other outgoing baseband data (such as web data, e-mail, or interactive video game data) from the processor/controller 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor/controller 340 can include one or more processors or other processing devices and execute the basic OS 361 stored in the memory 360 in order to control the overall operation of the UE 116. For example, the processor/controller 340 can control the reception of forward channel signals and the transmission of reverse channel signals by the RF transceiver 310, the RX processing circuitry 325, and the TX processing circuitry 315 in accordance with well-known principles. In some embodiments, the processor/controller 340 includes at least one microprocessor or microcontroller.

The processor/controller 340 is also capable of executing other processes and programs resident in the memory 360, such as operations for channel quality measurement and reporting for a system having a 2D antenna array as described in embodiments of the disclosure. The processor/controller 340 can move data into or out of the memory 360 as required by an executing process. In some embodiments, the processor/controller 340 is configured to execute the applications 362 based on the OS 361 or in response to a signal received from a gNB or an operator. The processor/controller 340 is also coupled to the I/O interface 345, which provides the UE 116 with the ability to connect to other devices such as a laptop computer and a handheld computer. The I/O interface 345 is the communication path between these accessories and the processor/controller 340.

The processor/controller 340 is also coupled to an input device(s) 350 and a display 355. The operator of the UE 116 can use the input device(s) 350 to enter data into the UE 116. The display 355 may be a liquid crystal display or other display capable of rendering text and/or at least limited graphics, such as from web sites. The memory 360 is coupled to the processor/controller 340. Portion of the memory 360 can include a random access memory (RAM), and another portion of the memory 360 can include a Flash memory or other read-only memory (ROM).

Although FIG. 3*a* illustrates one example of UE 116, various changes may be made to FIG. 3*a*. For example, various components in FIG. 3*a* can be combined, further subdivided, or omitted and additional components can be added according to particular needs. As a particular example, the processor/controller 340 can be divided into multiple processors, such as one or more central processing units (CPUs) and one or more graphics processing units (GPUs). Also, while FIG. 3*a* illustrates the UE 116 configured as a mobile telephone or smartphone, UEs can be configured to operate as other types of mobile or stationary devices.

FIG. 3*b* illustrates an example gNB 102 according to some embodiments of the disclosure. The embodiment of the gNB 102 shown in FIG. 3*b* is for illustration only, and other gNBs of FIG. 1 can have the same or similar configuration. However, gNBs come in a wide variety of configurations, and FIG. 3*b* does not limit the scope of this disclosure to any particular implementation of an gNB. It is noted that gNB 101 and gNB 103 can include the same or similar structure as gNB 102.

As shown in FIG. 3*b*, the gNB 102 includes multiple antennas 370*a*-370*n*, multiple RF transceivers 372*a*-372*n*, transmit (TX) processing circuitry 374, and receive (RX) processing circuitry 376. In certain embodiments, one or more of the multiple antennas 370*a*-370*n* include 2D antenna arrays. The gNB 102 also includes a controller/processor 378, a memory 380, and a backhaul or network interface 382.

The RF transceivers 372*a*-372*n* receive, from the antennas 370*a*-370*n*, incoming RF signals, such as signals transmitted by UEs or other gNBs. The RF transceivers 372*a*-372*n* down-convert the incoming RF signals to generate IF or baseband signals. The IF or baseband signals are transmitted to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372*a*-372*n* receive the outgoing processed baseband or IF signals from the TX processing circuitry 374 and up-converts the baseband or IF signals to RF signals that are transmitted via the antennas 370*a*-370*n*.

The controller/processor 378 can include one or more processors or other processing devices that control the overall operation of the gNB 102. For example, the controller/processor 378 can control the reception of forward channel signals and the transmission of reverse channel signals by the RF transceivers 372*a*-372*n*, the RX processing circuitry 376, and the TX processing circuitry 374 in accordance with well-known principles. The controller/processor 378 can support additional functions as well, such as more advanced wireless communication functions. For instance, the controller/processor 378 can perform the blind interference sensing (BIS) process, such as performed by a BIS algorithm, and decodes the received signal subtracted by an interfering signal. Any of a wide variety of other functions can be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for a system having a 2D antenna array as described in embodiments of the disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as portion of a cellular communication system (such as one supporting 5G, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the internet). The backhaul or network interface 382 includes any suitable structure supporting communications over a wired or wireless connection, such as an Ethernet or RF transceiver.

The memory 380 is coupled to the controller/processor 378. Portion of the memory 380 can include a RAM, and another portion of the memory 380 can include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372*a*-372*n*, TX processing circuitry 374, and/or RX processing circuitry 376) support communication with aggregation of FDD cells and TDD cells.

Although FIG. 3*b* illustrates one example of an gNB 102, various changes may be made to FIG. 3*b*. For example, the gNB 102 can include any number of each component shown in FIG. 3. As a particular example, an access point can include a number of interfaces 382, and the controller/processor 378 can support routing functions to route data between different network addresses. As another particular example, while shown as including a single instance of TX processing circuitry 374 and a single instance of RX processing circuitry 376, the gNB 102 can include multiple instances of each (such as one per RF transceiver).

Example embodiments of the disclosure are further described below with reference to the accompanying drawings.

Text and drawings are provided as examples only to help readers understand the disclosure. They are not intended and should not be interpreted as limiting the scope of the disclosure in any way. Although certain embodiments and examples have been provided, based on the disclosure herein, it will be apparent to those skilled in the art that changes may be made to the illustrated embodiments and examples without departing from the scope of the disclosure.

It can be understood by those skilled in the art that, the singular forms "a", "an", "said" and "the" used herein may also include plural forms unless expressly stated. It should be further understood that the word "comprise" used in the specification of the present disclosure means the presence of stated features, integers, steps, operations, elements and/or components, but does not exclude the presence or addition of one or more other features, integers, steps, operations, elements, components and/or groups thereof. It should be understood that when an element is referred to as being "connected" or "coupled" to another element, it may be directly connected or coupled to other elements, or there may be intermediate elements. In addition, "connect" or "couple" as used herein may include wireless connection or wireless coupling. As used herein, the phrase "and/or" includes all or any unit and all combinations of one or more associated listed items.

It can be understood by those skilled in the art that unless otherwise defined, all terms, including technical terms and scientific terms, used herein have the same meanings as those generally understood by those skilled in the art to which the present disclosure belongs. It should also be understood that terms such as those defined in a general dictionary should be understood to have meanings consistent with those in the context of the prior art, and will not be interpreted in idealized or overly formal meanings unless specifically defined herein.

It can be understood by those skilled in the art that "user equipment (UE)", "terminal" and "terminal device" used herein include not only devices with wireless signal receiver which have no transmitting capability, but also devices with receiving and transmitting hardware which can carry out bidirectional communication on a bidirectional communication link. In embodiments of the application, when the sidelink communication system is V2X system, "user equipment (UE)", "terminal" and "terminal device" may be various types such as vehicles, infrastructure and pedestrians. Such devices may include cellular or other communication devices with single-line displays or multi-line displays or cellular or other communication devices without multi-line displays; PCS (personal communications service), which may combine voice, data processing, fax and/or data communication capabilities; PDAs (personal digital assistants), which may include a radio frequency receiver, a pager, an internet/intranet access, a web browser, a notepad, a calendar and/or a GPS (global positioning system) receiver; a conventional laptop and/or palmtop computer or other devices having and/or including a radio frequency receiver. As used herein, "terminal" and "terminal device" may be portable, transportable, installed in vehicles (aviation, sea transportation and/or land), or suitable and/or configured to operate locally, and/or in distributed form, operate on the earth and/or any other position in space. As used herein, "user equipment UE", "terminal" and "terminal device" may also be a communication terminal, an internet terminal, a music/video playing terminal, such as a PDA, a MID (mobile internet device) and/or a mobile phone with music/video playing functions, a smart TV, a set-top box and other devices.

A slot in embodiments of the application may be either a subframe or slot in a physical sense, or a subframe or slot in a logical sense. Specifically, a subframe or slot in a logical sense is a subframe or slot corresponding to a resource pool of a sidelink communication. For example, in the V2X system, the resource pool is defined by a repeated bitmap mapped to a specific slot set, which may be all slots or all other slots except some specific slots (such as slots for transmitting the MIB/SIB). A slot indicated as "1" in the bitmap may be used for V2X transmission and belongs to slots corresponding to the V2X resource pool. A slot indicated as "0" cannot be used for V2X transmission and does not belong to slots corresponding to the V2X resource pool.

The difference between subframes or slots in a physical sense and that in a logical sense is explained by a typical application scenario: when calculating the time domain gap between two specific channels/messages (e.g., a PSSCH carrying sidelink data and a PSFCH carrying corresponding feedback information), and it is assumed that the gap is N slots, if calculating subframes or slots in a physical sense, the N slots correspond to the absolute time length of N*x milliseconds in the time domain, and x is the time length of a physical slot (subframe) under the numerology of the scenario, in milliseconds; otherwise, if calculating subframes or slots in a logical sense, taking a sidelink resource pool defined by a bitmap as an example, the intervals among the N slots correspond to N slots indicated as "1" in the bitmap, and the absolute time length of the interval varies with the specific configuration of the sidelink communication resource pool, rather than a fixed value.

In embodiments of the application, a slot may be a complete slot or several OFDM symbols corresponding to a sidelink communication in a slot. For example, when the sidelink communication is configured to be performed on the X1-X2th OFDM symbols in each slot, in this scenario, a slot in the following embodiments refers to the X1-X2th OFDM symbols in a slot; for another example, when the sidelink communication is configured to be transmitted in a mini-slot, in this scenario, a slot in the following embodiments refers to the mini-slot defined or configured in the sidelink system, rather than the slot in the NR system; for still another example, when the sidelink communication is configured as symbol-level transmission, in this scenario, a slot in the embodiment may be replaced with OFDM symbols, or may be replaced with N OFDM symbols which are the time domain granularity of the symbol-level transmission.

In embodiments of the application, information configured by the base station, information indicated by a signaling, information configured by a higher layer, and preconfigured information may be a set of configuration information or multiple sets of configuration information. When information contains multiple sets of configuration information, the UE selects a set of configuration information from the multiple sets of configuration information for use according to a predefined condition. When information is a set of configuration information, the set of configuration information may contain multiple subsets, and the UE selects a subset from the multiple subsets for use according to a predefined condition.

In embodiments of the application, some of the technical solutions provided are specifically described based on the V2X system, but their application scenarios should not be limited to the V2X system in sidelink communication, but may also be applied to other sidelink transmission systems. For example, the design based on V2X subchannels in the following embodiments may also be used for D2D subchannels or other subchannels for sidelink transmission. The V2X resource pool in the following embodiments may also be replaced by the D2D resource pool in other sidelink transmission systems such as the D2D.

In embodiments of the application, "below a threshold value" may also be replaced by at least one of "above a threshold value", "below or equal to a threshold value", and "above or equal to a threshold value"; similarly, "higher than a threshold value" may be replaced by at least one of "lower than a threshold value", "lower than or equal to a threshold value", and "higher than or equal to a threshold value". Among them, the related expressions may be replaced by other expressions with the same or similar meanings, for example, "higher than" may also be expressed as "exceeding".

In embodiments of the application, a UE used for transmitting a physical sidelink data channel is referred to as a transmitting UE and is denoted as TX UE; a channel use for receiving physical sidelink data is referred to as a receiving UE and is denoted as RX UE.

In embodiments of the application, when a sidelink communication system is the V2X system, a terminal or UE may be various types of terminals or UE such as a Vehicle, an infrastructure, a pedestrian, etc.

In order to make the purpose, technical scheme and advantages of the application clearer, embodiments of the application will be further described in detail with reference to the accompanying drawings.

First Embodiment

Figure 4:
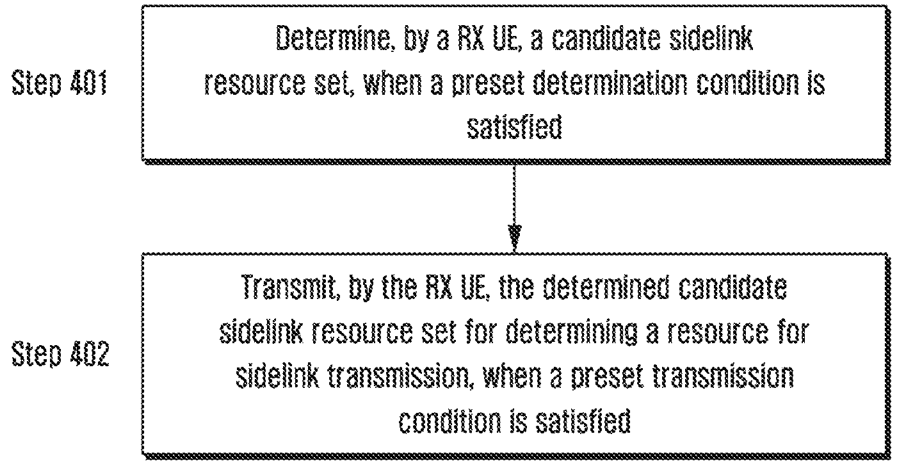
FIG. 4 illustrates a flowchart of a method for determining a sidelink resource.

The first embodiment describes a method for determining a sidelink resource. FIG. 4 is a flowchart of the method of the first embodiment.

In the first embodiment, the determining of the sidelink resource includes the following steps:

Step 401: determining, by an RX UE, a candidate sidelink resource set, when a preset determination condition is satisfied;

Step 402: transmitting, by the RX UE, the determined candidate sidelink resource set for determining a resource for sidelink transmission, when a preset transmission condition is satisfied.

In an example of the first embodiment, in step 402, transmitting, by the RX UE, the determined candidate sidelink resource set for determining a resource for sidelink transmission includes: transmitting, by the RX UE, the determined candidate sidelink resource set to the TX UE for determining the resource for sidelink transmission, wherein the determination of the resource for sidelink transmission is made by the TX UE according to the candidate sidelink resource set and/or a channel sensing result.

In another example of the first embodiment, in step 402, transmitting, by the RX UE, the determined candidate sidelink resource set for determining a resource for sidelink transmission includes: transmitting, by the RX UE, the determined candidate sidelink resource set to a base station for determining the resource for sidelink transmission, wherein the determination of the resource for sidelink transmission is made by the base station according to the candidate sidelink resource set; and wherein the resource for sidelink transmission includes a resource for a TX UE to transmit a sidelink transmission.

In another example of the first embodiment, before step 401 is performed, the method further includes the following steps: receiving, by the RX UE, a request that instructs the RX UE to assist the TX UE to determine a sidelink resource. Alternatively, the request may be transmitted by the TX UE to the RX UE. Alternatively, the request may be transmitted by the base station to the RX UE.

In the first embodiment, the preset determination condition in step 401 includes at least one of:

A Condition of a Configuration Attribute

The RX UE is (pre-)configured or (pre-)defined to assist other UEs to determine a sidelink resource, wherein the other UEs may be any sidelink UE or a specific sidelink UE. The specific sidelink UE includes a sidelink UE of which a UE ID or a UE group ID satisfies a specific condition or specific configuration information, which may be (pre-) configured or (pre-)defined by the base station or a higher layer. The TX UE may determine whether the RX UE is (pre-)configured or (pre-)defined to assist the other UEs to select a resource according to information configured by the higher layer or indicated by the RX UE;

The Tx UE is a specific sidelink UE, for example, of which a UE ID or a UE group ID satisfies a specific condition or specific configuration information, which may be (pre-)configured or (pre-)defined by the base station or higher layer;

The RX UE determines that a priority corresponding to data from the TX UE belongs to a specific range, which includes a range (pre-)configured or (pre-)defined by the base station or higher layer, and the priority may be indicated by Quality of Service (QoS);

The RX UE determines that a cast type (unicast, multicast, multicast type 1, multicast type 2, broadcast) corresponding to data from the TX UE is a specific type;

A Condition of a Link State

The number of times that the RX UE fails to successfully receive a sidelink transmission from the TX UE exceeds a specific threshold value, which may be (pre-)configured or (pre-)defined by a base station or higher layer. Wherein, the number of times of unsuccessful reception of the sidelink transmission from the TX UE may be the number of times of continuous unsuccessful reception. For example, when the RX UE successfully receives a PSCCH transmitted by the TX UE to the RX UE but fails to successfully receive a PSSCH associated with the PSCCH, and/or when the RX UE successfully receives a PSCCH transmitted by the TX UE to the RX UE and a sidelink resource is predetermined in the PSCCH, but the RX UE fails to successfully receive a sidelink transmission from the TX UE on the predetermined sidelink resource;

A link quality between the RX UE and the TX UE is lower than a predetermined threshold value, which may be (pre-) configured or (pre-)defined by the base station or higher layer, and the link quality being lower than the predetermined threshold value may be determined by at least one of:

- reference signal receiving power (RSRP) or reference signal receiving quality (RSRQ) of the TX UE which is measured by the RX UE being lower than a threshold value;
- RSRP or RSRQ which is fed back by the TX UE to the RX UE being lower than a threshold value;
- A channel state information (CSI) related parameter (e.g., a channel quality indication (CQI), a ranking indication (RI) and a payload missing indication (PMI)) of the TX UE which is measured by the RX UE being lower than a threshold value;
- A CSI related parameter (e.g., a CQI, a RI, a PMI) which is fed back by the TX UE to the RX UE being lower than a threshold value.

A geographical distance between the RX UE and the TX UE exceeds a threshold value, wherein the geographical distance is (pre-)configured by a higher layer and/or determined by the RX UE through calculating according to information dynamically indicated by the TX UE and a geographical position of the RX UE, the information dynamically indicated by the TX UE including a geographical position of the TX UE indicated in SCI and a geographical position of the TX UE indicated in a higher layer signaling;

The RX UE determines that a congestion degree of a resource pool (e.g., a channel busy ratio (CBR) or a channel occupancy ratio (CR)) exceeds a threshold value;

The RX UE detects that a sidelink resource indicated by the TX UE overlaps with a sidelink resource indicated by other sidelink UEs, wherein the indicated sidelink resources include a resource for current sidelink transmission indicated in SCI and a reserved resource for subsequent sidelink transmission;

a Condition of a Time Parameter

The RX UE transmits a sidelink transmission to the TX UE within a specific time range. For example, the RX UE determines whether to transmit a sidelink transmission to the TX UE within an expected time range (slot n to slot n+n1), and if so, determines the candidate sidelink resource set on slot n−n0 or no later than slot n−n0;

The RX UE is (pre-)configured to periodically determine the candidate sidelink resource set. For example, on slot n, if n−n1 may be evenly divisible by p, the candidate sidelink resource set is determined, wherein n1 is an offset corresponding to a start position of a period and p is a length of the period;

Wherein, the time range and period are (pre-)configured or (pre-)defined.

A Condition of Receiving a Request

The RX UE receives a request that instructs the RX UE to assist the TX UE to determine a sidelink resource. Alternatively, the request is transmitted by the TX UE to the RX UE. Alternatively, the request is transmitted by the base station to the RX UE. Alternatively, the transmitting of the request occurs when a preset request condition is satisfied.

Wherein the preset request condition includes at least one of the following conditions:

The above condition of a configuration attribute;

The above condition of a link state;

The above condition of a time parameter;

The TX UE being (pre-)configured to be able to request other UEs to assist to determine a sidelink resource;

The TX UE periodically transmitting a request to regularly update a status of an available resource of the RX UE;

A packet reception ratio (PRR) and/or packet inter-reception (PIR) of the TX UE for a period of time and/or for a specific service being lower than a threshold value.

In the first embodiment, the preset transmission condition in step 402 includes at least one of:

At least one of the above preset determination condition. For example, the RX UE transmits the determined candidate sidelink resource set to the TX UE, every time the above preset determination condition is satisfied;

A sidelink transmission transmitted by the RX UE to the TX UE or the RX UE transmitting a sidelink transmission to the TX UE within a specific time range existing. For example, if the RX UE determines the candidate sidelink resource set in slot n and transmits a sidelink transmission to the TX UE within a time window no later than slot n+k, the candidate sidelink resource set is carried in the sidelink transmission;

The RX UE periodically transmitting the determined candidate sidelink resource set to the TX UE. For example, on slot n, if n−n1 may be evenly divisible by p, the determined candidate sidelink resource set is transmitted to the TX UE, wherein n1 is an offset corresponding to a start position of a period and p is a length of the period;

The RX UE receiving n sidelink transmissions from the TX UE. Wherein the n sidelink transmissions may only include sidelink transmissions that are successfully decoded, and may also include sidelink transmissions that are successfully decoded and sidelink transmissions that fail to be successfully decoded. For a situation that sidelink transmissions that fail to be successfully decoded are included, the situation further includes: (i) a situation that a PSCCH is successfully decoded but a PSSCH fails to be unsuccessfully decoded, and/or (ii) a situation that a PSCCH and a PSSCH fail to be successfully decoded, but previous SCI content indicates that a resource location of the PSCCH and/or PSSCH is predetermined.

In the first embodiment, the method for determining the candidate sidelink resource set by the RX UE in step 401 includes at least one of:

Determining an initial candidate sidelink resource set by the RX UE, according to an expected time when the RX UE receives a sidelink transmission and/or an expected time when the TX UE transmits a sidelink transmission; further, determining the initial candidate sidelink resource set by the RX UE includes determining a time range corresponding to the candidate sidelink resource set and taking all sidelink time-frequency resources within the range as the initial candidate sidelink resource set by the RX UE;

Excluding some sidelink resources from the initial candidate sidelink resource set by the RX UE, according to the channel sensing result.

For example, if the RX UE detects that RSRP (or RSRQ) of a sidelink signaling for indicating resource reservation from other sidelink UEs is higher than a threshold value in a channel sensing process, the RX UE excludes sidelink resources reserved by the sidelink signaling according to the channel sensing result;

For another example, if the RX UE detects that RSRP and/or RSRQ and/or Received Signal Strength Indication (RSSI) of a first resource is higher than a threshold value in the channel sensing process, the first resource is excluded from the initial candidate sidelink resource set; if the RX UE detects that the RSRP and/or RSRQ and/or RSSI of the first resource is higher than a threshold value in the channel sensing process and the first resource is associated with a second resource in the initial candidate sidelink resource set, the second resource is excluded from the initial candidate sidelink resource set; wherein the first resource and the second resource are both sidelink resources, and the association between the first resource and the second resource includes a (pre-)configured or (pre-)defined time domain and/or frequency domain mapping. For example, according to a pre-configuration, the first resource is a sidelink resource in subchannel m in slot n, and the second resource is a sidelink resource in subchannel m+m1 in slot n+n1, wherein n1 and m1 are (pre-)configured or (pre-)defined;

For another example, sorting resources detected by the RX UE in the channel sensing process (referred to as first resources) includes sorting the first resources according to RSRP and/or RSRQ and/or RSSI of each of the first resources, and/or sorting associated second resources according to the RSRP and/or RSRQ and/or RSSI of the first resources; if the sorted first resources are not within a given threshold value range and the first resources are associated with second resources in the initial candidate sidelink resource set, and/or if the sorted second resources are not within a given threshold value range, the second resources are excluded from the initial candidate sidelink resource set; further, if the number of sidelink resources in the initial candidate sidelink resource set (which may be remaining sidelink resources after exclusion by other methods) is higher than a threshold value, this method is used. For example, assuming that the threshold value range is 0%~x % (that is, the lowest x %), if the first resources do not belong to a resource range of the lowest x % of RSSIs when sorted by RSSI, and the first resources are associated with second resources in the initial candidate sidelink resource set, the second resources are excluded from the initial candidate sidelink resource set. For example, assuming that the threshold value range is N and the associated second resources are sorted by the RSSIs of the first resources, the first N second resources (that is, the N second resources with the lowest RSSIs of the associated first resources) are reserved in the initial candidate sidelink resource set and other second resources are excluded. Wherein the first resource and the second resource are both sidelink resources, and the association between the first resource and the second resource includes a (pre-)configured or (pre-)defined time domain and/or frequency domain mapping, and the specific method is similar to the above;

Excluding a sidelink resource that overlaps or partially overlaps with the following times from the initial candidate sidelink resource set: a time when the RX UE is expected to transmit a sidelink or uplink transmission, and a time when the RX UE is expected to receive a downlink transmission. For example, if the initial candidate sidelink resource set of the RX UE includes all sidelink resources from slot n to slot n+10, and the RX UE is scheduled by a base station to transmit an uplink transmission on slot n+5, then the RX UE excludes all sidelink resources in slot n+5 from the initial candidate sidelink resource set;

In the above method, threshold values for the RSRP, RSRQ and RSSI or corresponding threshold value ranges after sorting are (pre-)configured or (pre-)defined, and RX UE may increase the threshold values or threshold value ranges (e.g., by +3 dB, from x % to x %+10%) when the number of sidelink resources in the initial candidate sidelink resource set is less than a specific number;

The RX UE determining the candidate sidelink resource set of the RX UE according to a received candidate sidelink resource set from the TX UE. For example, the RX UE excludes resources not included in the candidate sidelink resource set of the TX UE, and/or determines that the candidate sidelink resource set of the TX UE is the candidate sidelink resource set of the RX UE or the initial candidate sidelink resource set of the TX UE;

The RX UE determining resources not excluded in the initial candidate sidelink resource set as the candidate sidelink resource set.

For the combined use of more than one of the above methods, a specific example is as follows: the RX UE determines the initial candidate sidelink resource set according to an expected time when a sidelink transmission is received and/or an expected time when the TX UE transmits a sidelink transmission; according to the above multiple methods, resources corresponding to each method are excluded from the initial candidate sidelink resource set, for example, sidelink resources reserved by other sidelink UEs, resources for which the RSSIs of the associated first resources are higher than a threshold value, and resources overlapping with the sidelink/uplink/downlink transmission or reception time are excluded; after the above resources are excluded, if the number of remaining sidelink resources in the initial candidate sidelink resource set is higher than a threshold value of N, remaining second sidelink resources in the initial candidate sidelink resource set are sorted according to the RSSIs of the associated first resources, and the first N second resources are selected as candidate sidelink resource sets.

In the first embodiment, the method for transmitting the determined candidate sidelink resource set by the RX UE to determine the resource for sidelink transmission in step 402 includes at least one of:

Indicating the determined candidate sidelink resource set in a Radio Resource Control (RRC) signaling by the RX UE. For example, it is indicated by a specific RRC Information Element (IE);

Indicating the determined candidate sidelink resource set in a medium access control (MAC) signaling by the RX UE. For example, it is indicated by a specific MAC control element (CE) with a proprietary logical channel ID (LCID); for another example, it is indicated by a MAC header or MAC sub-header;

Indicating the determined candidate sidelink resource set in a physical layer signaling by the RX UE. For example, it is indicated by a specific SCI format (e.g., SCI format 3), which may be different from a PSCCH format used for scheduling a PSSCH in a bearer PSCCH in the prior art; for another example, the determined candidate sidelink resource set is indicated by carrying it in the sidelink transmission transmitted by the RX UE to the TX UE, specifically, the determined candidate sidelink resource set is piggybacked on a PSSCH in the form of PSCCH or independent data, and more specifically, the determined candidate sidelink resource set is mapped at a specific resource element (RE) position of the PSSCH, and this PSSCH is rate matched around the specific RE location or the PSSCH at the specific RE location is punctured.

In the first embodiment, the method for determining the resource for sidelink transmission by the TX UE or the base station according to the candidate sidelink resource set and/or the channel sensing result includes at least one of:

In the candidate sidelink resource set, excluding a sidelink resource that overlaps or partially overlaps with the following times: a time when the TX UE is expected to transmit an uplink transmission, a time when the TX UE is expected to transmit other sidelink transmissions (other than sidelink transmissions transmitted to the RX UE), and a time when the TX UE is expected to receive a sidelink transmission or downlink transmission;

In the remaining sidelink resources in the candidate sidelink resource set, determining a resource for transmitting a sidelink transmission to the RX UE by the TX UE. Alternatively, the selection includes a random selection. Alternatively, the selection further includes performing channel sensing based on the remaining sidelink resources in the candidate sidelink resource set, and selecting the resource for transmitting the sidelink transmission to the RX UE by the TX UE according to a result of the sensing;

Not selecting a resource for transmitting a sidelink transmission to the RX UE by the TX UE in the candidate sidelink resource set, and/or transmitting a request to the RX UE (again), if the number of sidelink resources indicated in the received candidate sidelink resource set from the RX UE is lower than a threshold value, and/or the number of remaining sidelink resources in the candidate sidelink resource set after exclusion is lower than a threshold value, content of the request including a requirement for the RX UE to assist the TX UE or base station to select a sidelink resource.

A typical application scenario of the embodiments is a resource allocation mode independently selected by a UE, i.e., Mode 2.

In the prior art, a TX UE using Mode 2 determines which resources are reserved by other sidelink UEs only according to a channel sensing result and excludes the above resources, and then randomly selects a sidelink resource for transmitting a sidelink transmission to an RX UE in remaining resources.

The main disadvantage of this method is that the TX UE can only select a resource based on a channel state sensed by itself. However, due to the different geographic locations of the TX UE and the RX UE, the interferences suffered are also different. The TX UE considers that the available resources may not be applicable to the RX UE based on the channel sensing result. The problem of a hidden node in a sidelink network is a typical example. As shown in FIG. 5, UE1 and UE3 are both within the communication range of UE2, but UE1 and UE3 are outside the communication range of each other. Therefore, when UE1 serves as a TX UE, it cannot sense the interference from UE3, but the interference from UE3 will actually cause damage to the reception of the transmission from UE1 by UE2.

The method in the first embodiment enables a TX UE to take sidelink resources preferred by an RX UE as a reference when selecting a sidelink resource, so as to avoid the above problems. Furthermore, if the RX UE provides a preferred resource set, the TX UE may perform channel sensing based on this resource set instead of all potential transmission resources. This method reduces the scale of channel sensing, thus reducing the complexity and power consumption of the TX UE.

Second Embodiment

The second embodiment describes a method for determining a sidelink resource. FIG. 6 is a flowchart of the method of the second embodiment.

In the second embodiment, the determining of the sidelink resource includes the following steps:

Step 601: determining, by a TX UE, a candidate sidelink resource set, when a preset determination condition is satisfied;

Step 602: transmitting, by the TX UE, the determined candidate sidelink resource set to a base station for determining a resource for sidelink transmission, when a preset transmission condition is satisfied.

Wherein the determination of the resource for sidelink transmission is made by the base station according to the candidate sidelink resource set; wherein the resource for sidelink transmission includes a sidelink resource used by the TX UE to transmit a sidelink transmission to an RX UE.

In an example of the second embodiment, prior to step 601, the method further includes the following steps: receiving, by the TX UE, a request that instructs the TX UE to assist the base station to determine a sidelink resource. Alternatively, the request may be transmitted by the RX UE to the TX UE. Alternatively, the request may be transmitted by the base station to the TX UE.

In the second embodiment, the preset determination condition in step 601 includes at least one of:

A condition of a Configuration Attribute

The TX UE is (pre-)configured or (pre-)defined to assist the base station to select a resource;

The RX UE is a specific sidelink UE, for example, of which a UE ID, a UE group ID or a UE intra-group ID satisfies a specific condition or configuration information, which may be (pre-)configured or (pre-)defined by the base station or a higher layer;

A priority corresponding to data of the TX UE belongs to a specific range which includes a range (pre-)configured or (pre-)defined by the base station or higher layer, and the priority may be indicated by QoS;

A cast type (unicast, multicast, multicast type 1, multicast type 2, broadcast) corresponding to the data of the TX UE is a specific type;

A condition of a Link State

The number of times that the RX UE fails to successfully receive a sidelink transmission from the TX UE exceeds a specific threshold value, which may be (pre-)configured or (pre-)defined by the base station or higher layer. Wherein, the number of times of unsuccessful reception of the sidelink transmission from the TX UE may be the number of times of continuous unsuccessful reception. For example, when the TX UE receives a NACK feedback from the RX UE, and/or does not receive a feedback from the RX UE in unicast communication or multicast communication which feeds back an ACK and a NACK, it is considered that the RX UE fails to successfully receive the sidelink transmission from the TX UE.

A link quality between the RX UE and the TX UE is lower than a predetermined threshold value, which may be (pre-)configured or (pre-)defined by the base station or higher layer; the link quality being lower than a predetermined threshold value may be determined by at least one of:

RSRP or RSRQ of the RX UE which is measured by the TX UE being lower than a threshold value;

RSRP or RSRQ which is fed back by the RX UE to the TX UE being lower than a threshold value;

A CSI related parameter (e.g., a CQI, a RI, a PMI) of the RX UE which is measured by the TX UE being lower than a threshold value;

A CSI related parameter (e.g., a CQI, a RI, a PMI) which is fed back by the RX UE to the TX UE being lower than a threshold value;

A geographical distance between the TX UE and the RX UE exceeds a threshold value, wherein the geographical distance is (pre-)configured by the higher layer and/or determined by the TX UE through calculating according to information dynamically indicated by the RX UE and a geographical position of the TX UE, the information dynamically indicated by the RX UE including a geographical position of the RX UE indicated in SCI and a geographical position of the RX UE indicated in a higher layer signaling;

The TX UE determines that a congestion degree of a resource pool exceeds a threshold value, for example, that CBR or CR exceeds a threshold value;

A condition of a Time Parameter

The TX UE transmits a sidelink transmission to the RX UE within a specific time window. For example, the TX UE determines whether to transmit the sidelink transmission to the RX UE within an expected time range (slot N to slot n+n1), and if so, determines the candidate sidelink resource set on slot n−n0 or no later than slot n−n0;

The TX UE is (pre-)configured to periodically determine the candidate sidelink resource set. For example, on slot n, if n−n1 may be evenly divisible by p, the candidate sidelink resource set is determined, wherein n1 is an offset corresponding to a start position of a period and p is a length of the period;

Wherein, the time range and period are (pre-)configured or (pre-)defined.

A condition of Receiving a Request

The TX UE receives a request that instructs the TX UE to assist the base station to determine a sidelink resource. Alternatively, the request may be transmitted by the RX UE to the TX UE. Alternatively, the request may be transmitted by the base station to the TX UE.

Alternatively, the transmitting of the request occurs when a preset request condition is satisfied.

The preset request condition includes at least one of the following conditions:

The above condition of a configuration attribute;

The above condition of a link state;

The above condition of a time parameter;

The TX UE being (pre-)configured to be able to request other UEs to assist to determine a sidelink resource;

The TX UE periodically transmitting a request to regularly update a status of an available resource of the RX UE;

A PRR and/or PIR of the TX UE for a period of time and/or for a specific service being lower than a threshold value.

In the second embodiment, the preset transmission condition in step 602 includes at least one of:

At least one of the above preset determination condition. For example, the TX UE transmits the determined candidate sidelink resource set to the base station, every time the above preset determination condition is satisfied.

An uplink transmission scheduled by the base station for the TX UE existing, or the TX UE transmitting an uplink transmission to the base station within a specific time range. For example, if the TX UE determines the candidate sidelink resource set in slot n and transmits an uplink transmission to the base station within a time window no later than slot n+k, the candidate sidelink resource set is carried in the uplink transmission. The above uplink transmission may be any of the following: an uplink transmission for carrying other uplink data (instead of the candidate sidelink resource set) transmitted by UE3 to the base station, and an uplink transmission scheduled by the base station after UE3 requests an uplink resource for transmitting the candidate sidelink resource set from the base station;

The TX UE periodically transmitting the determined candidate sidelink resource set to the base station;

The TX UE transmitting N sidelink transmissions to the RX UE. Wherein, the N sidelink transmissions may only include sidelink transmissions successfully received by the RX UE, and may also include sidelink transmissions successfully received and sidelink transmissions unsuccessfully received by RX UE.

In the second embodiment, the method for determining the candidate sidelink resource set by the TX UE in step 601 includes at least one of:

Determining an initial candidate sidelink resource set by the TX UE, according to an expected time range within which the TX UE transmits a sidelink transmission and/or an expected time within which the RX UE receives a sidelink transmission; further, determining the initial candidate sidelink resource set by the TX UE includes determining a time range corresponding to the candidate sidelink resource set and taking all sidelink time-frequency resources within the range as the initial candidate sidelink resource set by the TX UE;

Excluding some sidelink resources from the initial candidate sidelink resource set by the TX UE, according to a channel sensing result.

For example, if the TX UE detects that RSRP (or RSRQ) of a sidelink signaling indicating resource reservation from other sidelink UEs is higher than a threshold value in a channel sensing process, the TX UE excludes sidelink resources reserved by the sidelink signaling;

For another example, if the TX UE detects that RSRP and/or RSRQ and/or RSSI of a first resource is higher than a threshold value in the channel sensing process, the first resource is excluded from the initial candidate sidelink resource set; if the RX UE detects that the RSRP and/or RSRQ and/or RSSI of the first resource is higher than a threshold value in the channel sensing process and the first resource is associated with a second resource in the initial candidate sidelink resource set, the second resource is excluded from the initial candidate sidelink resource set; wherein the first resource and the second resource are both sidelink resources, and the association between the first resource and the second resource includes a (pre-)configured or (pre-)defined time domain and/or frequency domain mapping. For example, according to a pre-configuration, the first resource is a sidelink resource in subchannel m in slot n, and the second resource is a sidelink resource in subchannel m+m1 in slot n+n1, wherein n1 and m1 are (pre-)configured or (pre-)defined;

For another example, sorting resources detected by the TX UE in the channel sensing process (referred to as first resources) includes sorting the first resources according to RSRP and/or RSRQ and/or RSSI of each of the first resources, and/or sorting associated second resources according to the RSRP and/or RSRQ and/or RSSI of the first resources; if the sorted first resources are not within a given threshold value range and the first resources are associated with second resources in the initial candidate sidelink resource set, and/or if the sorted second resources are not within a given threshold value range, the second resources are excluded from the initial candidate sidelink resource set; further, if the number of sidelink resources in the initial candidate sidelink resource set (which may be the remaining sidelink resources after excluding by other methods) is higher than a threshold value, this method is used. For example, assuming that the threshold value range is 0%~x % (that is, the lowest x %), if the first resources do not belong to a resource range of the lowest x % of RSSIs when sorted by RSSI, and the first resources are associated with second resources in the initial candidate sidelink resource set, the second resources are excluded from the initial candidate sidelink resource set. For example, assuming that the threshold value range is N and the associated second resources are sorted by the RSSIs of the first resources, the first N second resources (that is, the N second resources with the lowest RSSIs of the associated first resources) are reserved in the initial candidate sidelink resource set and other second resources are excluded. The first resource and the second resource are both sidelink resources, and the association between the first resource and the second resource includes a (pre-)configured or (pre-)defined time domain and/or frequency domain mapping, and the specific method is similar to the above;

Excluding a sidelink resource that overlaps or partially overlaps with the following times from the initial candidate sidelink resource set: a time when the TX UE is expected to transmit a sidelink or uplink transmission, and a time when the TX UE is expected to receive a downlink transmission. For example, if the initial candidate sidelink resource set of the TX UE includes all sidelink resources from slot n to slot n+10, and the TX UE is scheduled by the base station to transmit an uplink transmission in slot n+5, the TX UE excludes all sidelink resources in slot n+5 from the initial candidate sidelink resource set;

In the above method, threshold values for the RSRP, RSRQ and RSSI or corresponding threshold value ranges after sorting are (pre-)configured or (pre-)defined, and UE3 may increase the threshold values or threshold value ranges (e.g., by +3 dB, from x % to x %+10%) when the number of sidelink resources in the initial candidate sidelink resource set is less than a specific number.

The TX UE determining the candidate sidelink resource set of the TX UE according to the received candidate sidelink resource set from the RX UE. For example, the TX UE excludes resources not included in the candidate sidelink resource set of the RX UE, and/or determines that the candidate sidelink resource set of the RX UE is the candidate sidelink resource set of the TX UE or the initial candidate sidelink resource set of the TX UE;

The TX UE determining resources not excluded in the initial candidate sidelink resource set as the candidate sidelink resource set.

For the combined use of more than one of the above methods, a specific example is as follows: the TX UE receives the candidate sidelink resource set from the RX UE and determines that the candidate sidelink resource set of the RX UE is the initial candidate sidelink resource set of the TX UE; then, according to the above multiple methods, resources corresponding to each method are excluded from the initial candidate sidelink resource set, for example, sidelink resources reserved by other sidelink UEs, resources for which the RSSIs of the associated first resources are higher than a threshold value, and resources overlapping with the sidelink/uplink/downlink transmission or reception time are excluded; after the above resources are excluded, if the number of remaining sidelink resources in the initial candidate sidelink resource set is higher than a threshold value of N, remaining second sidelink resources in the initial candidate sidelink resource set are sorted according to the RSSIs of the associated first resources, and the first N second resources are selected as candidate sidelink resource sets.

In the second embodiment, the method of transmitting the determined candidate sidelink resource set to the base station by the TX UE to determine the resource for sidelink transmission in step 602 includes at least one of:

Indicating the determined candidate sidelink resource set in an RRC signaling by the TX UE. For example, it is indicated by a specific RRC IE;

Indicating the determined candidate sidelink resource set in a MAC signaling by the TX UE. For example, it is indicated by a specific MAC CE with a proprietary LCID. For another example, it is indicated by a MAC header/MAC sub-header;

Indicating the determined candidate sidelink resource set in a physical layer signaling by the TX UE. For example, it is indicated by a specific PUCCH format, which may be different or the same as the PUCCH format in the prior art. For another example, the determined candidate sidelink resource set is indicated by carrying it in the uplink transmission transmitted by the TX UE to the base station, specifically, the determined candidate sidelink resource set is piggybacked on a PUSCH in the form of PUCCH or independent data, and the more specific method is similar to the method of piggybacking a PUCCH on a PUSCH in the prior art.

A typical application scenario of the embodiments is a resource allocation mode based on base station scheduling, which is also Mode 1.

In the prior art, the TX UE using Mode 1 requests a sidelink resource from the base station through a status report (SR) and/or a Buffer Status Report (BSR) and a sidelink HARQ-ACK report, and after obtaining a sidelink resource scheduled by the base station, uses the sidelink resource to transmit a sidelink transmission to the RX UE.

The main disadvantage of this method is that the base station can only schedule sidelink UEs using Mode 1 in the cell and minimize the mutual interference among the sidelink UEs, but cannot control UEs in the neighboring cell and sidelink UEs using Mode 2 in the cell. Therefore, if a resource pool used by a sidelink UE of Mode 1 overlaps with a resource pool for a UE in the neighboring cell and a sidelink UE using Mode 2 in the cell, resources scheduled by a base station for sidelinks using Mode 1 may be interfered by this part of UEs.

The method in the second embodiment enable a base station to take sidelink resources preferred by a TX UE as a reference when scheduling a sidelink resource for the TX UE, so as to avoid potential interferences.

Third Embodiment

The third embodiment describes a method for determining a sidelink resource. FIG. 7 is a flowchart of the method of the third embodiment.

In the third embodiment, a plurality of sidelink UEs are (pre-)configured as a UE group by a base station or higher layer, and UE M is configured as a manager of the UE group, and UEs m1, m2, . . . are other group member UEs of the UE group.

In the third embodiment, the determining of the sidelink resource includes the following steps:

Step 701: determining, by UE M, a candidate sidelink resource set, when a preset determination condition is satisfied;

Step 702: transmitting, by UE M, the determined candidate sidelink resource set to at least one of the group member UEs m1, m2, . . . , when a preset transmission condition is satisfied, the candidate sidelink resource set being used for determining a resource for sidelink transmission.

Wherein, the determination of the resource for sidelink transmission is made by at least one of the group member UEs m1, m2, . . . , according to the candidate sidelink resource set and/or a channel sensing result.

In an example of the third embodiment, before step 701 is performed, the method further includes the following steps: receiving, by UE M, a request that includes an indication requesting UE M to assist at least one of UEs m1, m2, . . . to determine a sidelink resource. Alternatively, the request may be directly transmitted by at least one of UEs m1, m2, . . . to UE M. Alternatively, the request may be transmitted by the base station to the UE M. It should be noted that the group member UE in the following description may be at least one group member UE in the UE group.

In the third embodiment, the preset determination condition in step 701 includes at least one of:

(1) A Condition of a Configuration Attribute

UE M is (pre-)configured or (pre-)defined to assist other UEs to determine a sidelink resource, wherein the other UEs may be any sidelink UEs, or specific sidelink UEs, or group member UEs; wherein the group member UEs may be any group member UEs or specific group member UEs.

The group member UE is a specific sidelink UE, for example, of which UE ID or UE group ID or UE intra-group ID satisfies a specific condition or specific configuration information, which may be (pre-)configured or (pre-)defined by the base station or higher layer;

UE M determines that a priority corresponding to data from the group member UE belongs to a specific range, and/or a priority corresponding to data of UE M belongs to a specific range; wherein the specific range includes a range (pre-)configured or (pre-)defined by the base station or higher layer, and the priority may be indicated by QoS.

UE M determines that a cast type (unicast, multicast, multicast type 1, multicast type 2, broadcast) corresponding to data from the group member UE is a specific type, and/or a cast type corresponding to data of UE M is a specific type;

(2) A Condition of a Link State

The number of times that UE M fails to successfully receive a sidelink transmission from the group member UE exceeds a specific threshold value, and/or the number of times that the group member UE fails to successfully receive a sidelink transmission from UE M exceeds a specific threshold value, which may be (pre-)configured or (pre-) defined by the base station or higher layer;

A link quality between UE M and the group member UE is lower than a predetermined threshold value, which may be (pre-)configured or (pre-)defined by the base station or higher layer, and the link quality being lower than a predetermined threshold value may be determined by at least one of:

RSRP or RSRQ of the group member UE which is measured by UE M being lower than a threshold value;

RSRP or RSRQ which is fed back by the group member UE to UE M being lower than a threshold value;

A channel state information related parameter of the group member UE which is measured by UE M being lower than a threshold value;

A CSI related parameter which is fed back by the group member UE to UE M being lower than a threshold value;

A geographical distance between UE M and the group member UE exceeds a threshold value, wherein the geographical distance is (pre)configured by the higher layer and/or determined by UE M through calculating according to information dynamically indicated by the group member UE and a geographical position of UE M, the information dynamically indicated by the group member UE including a geographical position of the group member UE indicated in SCI and a geographical position of the group member UE indicated in a higher layer signaling;

UE M determines that a congestion of a resource pool exceeds a threshold value, for example, that CBR or CR exceeds a threshold value;

UE M detects that a resource for sidelink transmission indicated by the group member UE overlaps with a resource for sidelink transmission indicated by other sidelink UEs, and/or UE M detects that resources indicated by different group members UEs overlap, wherein the indicated resource includes a resource for current sidelink transmission indicated in SCI and a reserved resource for subsequent sidelink transmission;

(3) A Condition of a Time Parameter

UE M transmits a sidelink transmission to the group member UE within a specific time range;

UE M is (pre-)configured to periodically determine the candidate sidelink resource set;

Wherein, the time range and period are (pre-)configured or (pre-)defined.

(4) A Condition of Receiving a Request

The UE M receives a request that includes a request for requesting the UE M to assist the group member UE to determine a sidelink resource. Alternatively, the request is transmitted by the group member UE to the UE M. Alternatively, the request is transmitted by the base station to the UE M. Alternatively, the transmitting of the request occurs when a preset request condition is satisfied.

The preset request condition includes at least one of the following conditions:

The above condition of a configuration attribute;

The above condition of a link state;

The above condition of a time parameter;

The group member UE being (pre-)configured to be able to request other UEs to assist to determine a sidelink resource;

The group member UE being (pre-)configured to periodically transmit a request to regularly update a status of an available resource and/or a status of intra-group resource allocation of an RX UE corresponding to the group member;

A PRR and/or PIR of the group member UE for a period of time and/or for a specific service being lower than a threshold value.

In the third embodiment, the preset transmission condition in step 702 includes at least one of:

At least one of the above preset determination condition;

A sidelink transmission transmitted by UE M to the group member UE existing or UE M transmitting a sidelink transmission to the group member UE within a specific time range;

UE M periodically transmitting the determined candidate sidelink resource set to the group member UE;

UE M receiving N sidelink transmissions from the group member UE; wherein the N sidelink transmissions may only include sidelink transmissions from the same group member UE, and may also include sidelink transmissions from any group members or sidelink transmissions from a specific group member set.

In the third embodiment, the method of determining the candidate sidelink resource set by UE M in step 701 is similar to that in other embodiments, for example, it includes at least one of:

determining the initial candidate sidelink resource set by UE M according to at least one of an expected time when UE M receives a sidelink transmission and/or an expected time when the group member UE transmits a sidelink transmission, and/or an expected time when the group member UE receives a sidelink transmission, the (pre-) definition or the (pre-) configuration of the higher layer/base station, and a group ID, and for example, UE M calculates and obtains the initial candidate sidelink resource set according to a predefined formula and a group identity; further, determining the initial candidate sidelink resource set by UE M includes determining a time range corresponding to the candidate sidelink resource set and taking all sidelink time-frequency resources within the range as the initial candidate sidelink resource set by UE M;

Excluding some sidelink resources from the initial candidate sidelink resource set by UE M according to the channel sensing result, wherein the exclusion methods described in other embodiments may be applied here;

According to a time when the group member UE is expected to transmit a sidelink or uplink transmission and a time when the group member UE is expected to receive a downlink transmission, excluding a sidelink resource overlapping or partially overlapping with the above times from the initial candidate sidelink resource set;

Determining the candidate sidelink resource set of UE M according to the received candidate sidelink resource set from the group member UE. For example, UE M excludes resources not included in the candidate sidelink resource set of the group member UE, and/or determines that the candidate sidelink resource set of the group member UE is the candidate sidelink resource set of UE M or the initial candidate sidelink resource set of the group member UE;

Dividing the initial candidate sidelink resource set or resources remaining after excluding the resources in the initial candidate sidelink resource set into several subsets and allocating the divided subsets to the group member UEs as candidate sidelink resource sets by UE M; specifically, each group member UE is allocated at least one subset, and/or each subset is allocated to at least one group member UE.

For the combined use of the above method and the methods provided in other embodiments, a specific example is as follows: UE M determines the initial candidate sidelink resource set according to the (pre)definition or the (pre) configuration of the higher layer/base station, and/or according to the group identity; UE M divides the initial candidate sidelink resource set into several subsets, and allocates each divided subset to one group member UE; according to candidate sidelink resource sets transmitted by each group member UE to the group member UEs of UE M, UE M excludes sidelink resources not in a candidate sidelink resource set of a certain group member UE from a subset allocated for the group member UE; and UE M transmits the excluded remaining subset to the group member UE.

In the third embodiment, the method for transmitting the determined candidate sidelink resource set by UE M to determine the resource for sidelink transmission in step 702 is similar to that in other embodiments, for example, it includes at least one of:

Indicating the determined candidate sidelink resource set in a radio resource control (RRC) signaling by UE M;

Indicating the determined candidate sidelink resource set in a medium access control (MAC) signaling by UE M;

Indicating the determined candidate sidelink resource set in a physical layer signaling by UE M.

The method for determining the resource for sidelink transmission according to the determined candidate sidelink resource set and/or channel sensing result in step 703 includes at least one of:

In the third embodiment, the method for determining the resource for sidelink transmission by the group member UE or base station according to the candidate sidelink resource set and/or channel sensing result includes at least one of:

In the candidate sidelink resource set, excluding a sidelink resource overlapping or partially overlapping with the following times: a time when the group member UE is expected to transmit an uplink transmission, a time when the group member UE is expected to transmit other sidelink transmissions (for example, other sidelink transmissions except those transmitted to UE M and/or a group member UE that is an RX UE), and a time when the group member UE is expected to receive a sidelink transmission or downlink transmission;

In the remaining sidelink resources of the candidate sidelink resource set, determining a resource for transmitting a sidelink transmission to UE M or the group member UE that is the RX UE. Alternatively, the selection includes a random selection. Alternatively, the selection further includes performing channel sensing based on the remaining sidelink resources in the candidate sidelink resource set, and selecting the resource for transmitting the sidelink transmission to UE M according to a result of the sensing;

Not selecting a resource for transmitting a sidelink transmission to UE M in the candidate sidelink resource set, and/or transmitting a request to UE M (again), if the number of sidelink resources indicated in the received candidate sidelink resource set from UE M is lower than a threshold value, and/or the number of remaining sidelink resources in the candidate sidelink resource set after exclusion is lower than a threshold value, content of the request including a requirement for UE M to assist the group member UE to select a sidelink resource.

Further, this embodiment also includes: indicating candidate sidelink resource sets of all group member UEs in the same sidelink signaling in a multicast manner.

As another subject in this embodiment, the group member UE may transmit a request to UE5, content of the request including a requirement for UE5 to assist the group member UE to select a sidelink resource; if the group member UE receives the candidate sidelink resource set from UE5, it may also determine resources for transmitting sidelink transmissions to UE5 and/or other group members and/or other sidelink UEs according to the candidate sidelink resource set. The specific method is similar to that in other embodiments, and the description will not be repeated. A typical application scenario of the embodiments is multicast communication in a resource allocation mode (i.e., Mode 2) independently selected by a UE, especially multicast communication in Mode 2 in the scene of motorcade or in the scene where other group members are geographically close.

In the prior art, the main disadvantage of the using of Mode 2 is that there is no difference in resource selection method between multicast communication and unicast communication of TX UE.

In the third embodiment, a specific UE is taken as a group manager UE M, and UE M assists a group member UE m in resource selection as a further optimization based on the prior art. The method in the third embodiment may make the group manager UE M realize the effect of allocating sidelink resources for group members by providing information assisting resource selection, and play a scheduling role similar to a base station, thereby reducing the potential conflict risk among group members UE M.

In the prior art, the main disadvantage of the using of Mode 1 is that it is difficult for a base station to detect a channel condition of a sidelink UE.

In the third embodiment, the group manager UE M may infer the channel condition of the group member UE M through channel sensing to a certain extent. The gain is particularly significant when a distance between the group manager UE M and other group members UE M is close.

The methods for sidelink resource allocation in NR V2X system provided in the application may also be applied to, for example, LTE V2X system and other communication systems.

It can be understood by those skilled in the art that the disclosure includes devices related to performing one or more of the operations described in this application. These devices may be specially designed and manufactured for the desired purpose, or they may include known devices in general-purpose computers. These devices have computer programs stored therein that are selectively activated or reconfigured. Such a computer program may be stored in a device (e.g., computer) readable medium including, but not limited to, any type of disk (including floppy disk, hard disk, optical disk, CD-ROM, and magneto-optical disk), ROM (read-only memory), RAM (random access memory), EPROMO (erasable programmable read-only memory), EEPROM (electrically erasable programmable read-only memory), flash memory, magnetic card or optical card. That is, a readable medium includes any medium that stores or transmits information in a readable form by a device (e.g., a computer).

It can be understood by those skilled in the art that each block in these structural diagrams and/or block diagrams and/or flow diagrams and combinations of blocks in these structural diagrams and/or block diagrams and/or flow diagrams may be implemented by computer program instructions. It can be understood by those skilled in the art that these computer program instructions may be provided to a processor of a general-purpose computer, a professional computer or other programmable data processing methods for implementation, so that the solutions specified in the block or blocks of the structural diagram and/or block diagram and/or flow diagram disclosed by the disclosure may be executed by the processor of the computer or other programmable data processing methods.

It can be understood by those skilled in the art that the steps, measures and schemes in various operations, methods and processes discussed in the present disclosure may be alternated, changed, rearranged, decomposed, combined or deleted. In case of similar technical solutions, the execution subject and/or the specific implementation may be changed according to the scenario, and the range of the change may be obtained by those skilled in the art based on the prior art and common knowledge. For example, some operations and operating conditions of the transmitting UE may be applied to the receiving UE and/or the group manager UE in some scenarios.

The above is only part of the embodiments of the present disclosure, and it should be pointed out that for ordinary people in the technical field, without departing from the principles of the present disclosure, several improvements and embellishments may be made, which should also be regarded as the protection scope of the present disclosure.

The invention claimed is:

1. A method performed by a first user equipment (UE) in a communication system, the method comprising:
- receiving, from a second UE, request information instructing to assist a resource allocation mode 2 for sidelink transmission of the second UE, wherein the first UE is configured to assist a resource allocation mode 2 of the second UE;
- determining a set of preferred resources of the first UE after receiving the request information; and
- transmitting, to the second UE, information on the set of preferred resources of the first UE,
- wherein the determining of the set of preferred resources of the first UE comprises:
  - identifying an initial set of candidate resources,
  - excluding, from the initial set of candidate resources, at least one candidate resource within at least one slot in which the first UE is expected to perform transmission, wherein the first UE is a reception UE for the sidelink transmission of the second UE, and
  - determining the set of preferred resources of the first UE based on the initial set of candidate resources from which the at least one candidate resource is excluded.

2. The method of claim 1, wherein the request information is for data to be received by the first UE from the second UE.

3. The method of claim 1, wherein the information on the set of preferred resources of the first UE is transmitted via at least one of a medium access control (MAC) control element (CE) or a sidelink control information (SCI) format.

4. The method of claim 1, further comprising:
- receiving, from the second UE, the sidelink transmission of the second UE on at least one resource included in the set of preferred resources of the first UE.

5. The method of claim 1, wherein the transmission expected to be performed by the first UE includes sidelink transmission and uplink transmission.

6. A first user equipment (UE) in a communication system, the first UE comprising:
- a transceiver; and
- a processor coupled with the transceiver and configured to:
  - receive, from a second UE, request information instructing to assist a resource allocation mode 2 for sidelink transmission of the second UE, wherein the first UE is configured to assist a resource allocation mode 2 of the second UE;
  - determine a set of preferred resources of the first UE after receiving the request information; and
  - transmit, to the second UE, information on the set of preferred resources of the first UE,
- wherein, for the determining of the set of preferred resources of the first UE, the processor is configured to:
  - identify an initial set of candidate resources;
  - exclude, from the initial set of candidate resources, at least one candidate resource within at least one slot in which the first UE is expected to perform transmission, wherein the first UE is a reception UE for the sidelink transmission of the second UE; and
  - determine the set of preferred resources of the first UE based on the initial set of candidate resources from which the at least one candidate resource is excluded.

7. The first UE of claim 6, wherein the request information is for data to be received by the first UE from the second UE.

8. The first UE of claim 6, wherein the information on the set of preferred resources of the first UE is transmitted via at least one of a medium access control (MAC) control element (CE) or a sidelink control information (SCI) format.

9. The first UE of claim 6, wherein the processor is further configured to:
- receive, from the second UE, the sidelink transmission of the second UE on at least one resource included in the set of preferred resources of the first UE.

10. The first UE of claim 6, wherein the transmission expected to be performed by the first UE includes sidelink transmission and uplink transmission.

11. A method performed by a second user equipment (UE) in a communication system, the method comprising:
- transmitting, to a first UE, request information instructing to assist a resource allocation mode 2 for sidelink transmission of the second UE, wherein the second UE is configured to be assisted by the first UE for the resource allocation mode 2;
- receiving, from the first UE, information on a set of preferred resources of the first UE after transmitting the request information, wherein the set of preferred resources of the first UE is included in an initial set of candidate resources from which at least one candidate resource within at least one slot in which transmission of the first UE is expected is excluded and wherein the first UE is a reception UE for the sidelink transmission of the second UE;
- selecting at least one resource based on the information on set of preferred resources of the first UE and the resource allocation mode 2; and
- performing the sidelink transmission to the first UE based on the selected at least one resource.

12. The method of claim 11, wherein the information on the set of preferred resources of the first UE is received via at least one of a medium access control (MAC) control element (CE) or a sidelink control information (SCI) format.

13. The method of claim 11, wherein the request information is for data to be transmitted to the first UE.

14. The method of claim 11, wherein the selected at least one resource is included in the set of preferred resources.

15. The method of claim 11, wherein the transmission of the first UE includes sidelink transmission and uplink transmission.

16. A second user equipment (UE) in a communication system, the second UE comprising:
- a transceiver; and
- a processor coupled with the transceiver and configured to:
  - transmit, to a first UE, request information instructing to assist a resource allocation mode 2 for sidelink transmission of the second UE, wherein the second UE is configured to be assisted by the first UE for the resource allocation mode 2;
  - receive, from the first UE, information on a set of preferred resources of the first UE after transmitting the request information, wherein the set of preferred resources of the first UE is included in an initial set of candidate resources from which at least one candidate resource within at least one slot in which transmission of the first UE is expected is excluded and wherein the first UE is a reception UE for the sidelink transmission of the second UE;
  - select at least one resource based on the information on set of preferred resources of the first UE and the resource allocation mode 2; and
  - perform the sidelink transmission to the first UE based on the selected at least one resource.

17. The second UE of claim 16, wherein the information on the set of preferred resources of the first UE is received via at least one of a medium access control (MAC) control element (CE) or a sidelink control information, SCI, format.

18. The second UE of claim 16, wherein the request information is for data to be transmitted to the first UE.

19. The second UE of claim 16, wherein the selected at least one resource is included in the set of preferred resources.

20. The second UE of claim 16, wherein the transmission of the first UE includes sidelink transmission and uplink transmission.

* * * * *